(12) United States Patent
Altheimer et al.

(10) Patent No.: US 8,998,409 B2
(45) Date of Patent: Apr. 7, 2015

(54) VARIABLE PROGRESSIVE LENS DESIGN

(75) Inventors: Helmut Altheimer, Baisweil-Lauchdorf (DE); Wolfgang Becken, Munich (DE); Gregor Esser, Munich (DE); Dietmar Uttenweiler, Icking (DE)

(73) Assignee: Rodenstock GmbH, Munich (DE)

( * ) Notice: Subject to any disclaimer, the term of this patent is extended or adjusted under 35 U.S.C. 154(b) by 843 days.

(21) Appl. No.: 13/145,508

(22) PCT Filed: Dec. 21, 2009

(86) PCT No.: PCT/EP2009/009194
§ 371 (c)(1),
(2), (4) Date: Sep. 22, 2011

(87) PCT Pub. No.: WO2010/083868
PCT Pub. Date: Jul. 29, 2010

(65) Prior Publication Data
US 2012/0002161 A1    Jan. 5, 2012

(30) Foreign Application Priority Data
Jan. 20, 2009 (DE) .................. 10 2009 005 206

(51) Int. Cl.
G02C 7/06 (2006.01)
G02C 7/02 (2006.01)

(52) U.S. Cl.
CPC .............. G02C 7/024 (2013.01); G02C 7/025 (2013.01); G02C 7/028 (2013.01); G02C 7/061 (2013.01); G02C 7/066 (2013.01)

(58) Field of Classification Search
CPC ........ G02C 7/061; G02C 7/025; G02C 7/028; G02C 7/024

USPC ........................ 351/159.42, 159.74–159.77
See application file for complete search history.

(56) References Cited

U.S. PATENT DOCUMENTS

| | | |
|---|---|---|
| 2006/0050236 A1 | 3/2006 | Menezes |
| 2010/0296055 A1 | 11/2010 | Esser et al. |
| 2010/0309428 A1* | 12/2010 | Altheimer et al. ............ 351/169 |

FOREIGN PATENT DOCUMENTS

| | | |
|---|---|---|
| EP | 0880046 A1 | 11/1998 |
| JP | 2001-076177 | 3/2001 |

(Continued)

OTHER PUBLICATIONS

Jul. 26, 2013 Office Action for Japanese Patent Application No. 2011-545636 with English translation.

*Primary Examiner* — Scott J Sugarman
(74) *Attorney, Agent, or Firm* — Schiff Hardin LLP

(57) ABSTRACT

A method and apparatus for creating a progressive spectacle lens design by transforming a starting design. The starting design is defined to include specification of a principal line, specifications for target astigmatism values $A(u=0,y)$ along the principal line, and specifications for the course of a base target isoastigmatism line, which is described by a one-dimensional function of the form $u_G(y)=f(y)$. The method and apparatus transform the starting design by modifying the course of the base target isoastigmatism line $u_G(y) \rightarrow u'_G(y)$, and calculating the target astigmatism values $A(u,y)$ of the spectacle lens design by an interpolation between the target astigmatism values $A(u=0,y)$ on the principal line and the target astigmatism values $A(u'_G(y),y)$ on the modified base target isoastigmatism line. Furthermore, the method and apparatus are provided to create the spectacle lens for the wearer on the basis of the progressive spectacle lens design.

23 Claims, 10 Drawing Sheets

(56) References Cited

FOREIGN PATENT DOCUMENTS

| | | |
|---|---|---|
| JP | 2006-506667 | 2/2006 |
| JP | 2007-233388 | 9/2007 |
| WO | WO-2004/086125 A1 | 10/2004 |
| WO | WO-2007/004070 A1 | 1/2007 |
| WO | WO-2008/089995 A1 | 7/2008 |
| WO | WO-2008/089996 A1 | 7/2008 |
| WO | WO-2008/089998 A1 | 7/2008 |

* cited by examiner

VARIABLE PROGRESSIVE LENS DESIGN

The disclosure herein relates to a method for calculating an individual spectacle lens design, a method for creating an individual progressive spectacle lens, corresponding apparatuses for calculating an individual spectacle lens design and for creating an individual spectacle lens, corresponding computer program products and storage media, as well as a use of a spectacle lens.

BACKGROUND

The calculation and optimization of progressive spectacle lenses in the respective position of wear and situation of wear has achieved a high technical and optical standard since. For example, according to the prior art, progressive spectacle lenses can be optimized and calculated as one-of-a-kind online after receipt of order, taking into account the individual prescription (sph, cyl, axis, add, prism, base) and the individual positions or arrangements of the lenses in front of the spectacle wearer's eye (e.g. corneal vertex distance (CVD), face form angle (FFA), forward inclination or pantoscopic angle), as well as physiological parameters (e.g. pupillary distance). As a rule though, a customer may only choose from few (usually 2) spectacle lens designs, which only differ by the progression length.

Moreover, according to the prior art, own or individual target values (designs) are created and deposited for each design to be newly developed and also particularly for each progression zone length. For example, in addition to the universal progressive lenses, designs are also developed for various special progressive lenses, which often only differ with respect to the main visual tasks and thus with respect to the principal directions of sight in the near and distance zones. Therefore, PCT/DE01/00188 suggests specifying the design for different applications (driver, pilot, watchmaker, etc.) right away. Despite this very complex procedure concerning design creation and also concerning the logistics of the many different designs with the manufacturer and also the necessary product training courses with the optician, it is often not possible to satisfactorily react to individual situations of wear with these standard designs.

SUMMARY

The disclosure herein provides a fast, efficient, and flexible method for calculating a spectacle lens design, in particular an individual spectacle lens design, as well as a method for creating a spectacle lens according to the thus calculated spectacle lens design. Moreover, a corresponding apparatus is provided for creating a spectacle lens, in particular an individual spectacle lens, as well as corresponding computer program products and storage media. Further, a method for calculating a spectacle lens design is disclosed herein, in which the spectacle lens design is tailored to the individual preferences, main focuses of use, frame data, as well as other individual data of the spectacle wearer in an improved way.

BRIEF DESCRIPTION OF THE DRAWINGS

In the following, the disclosure herein will be exemplarily described with reference to the figures, which show.

DETAILED DESCRIPTION

Figure 1:
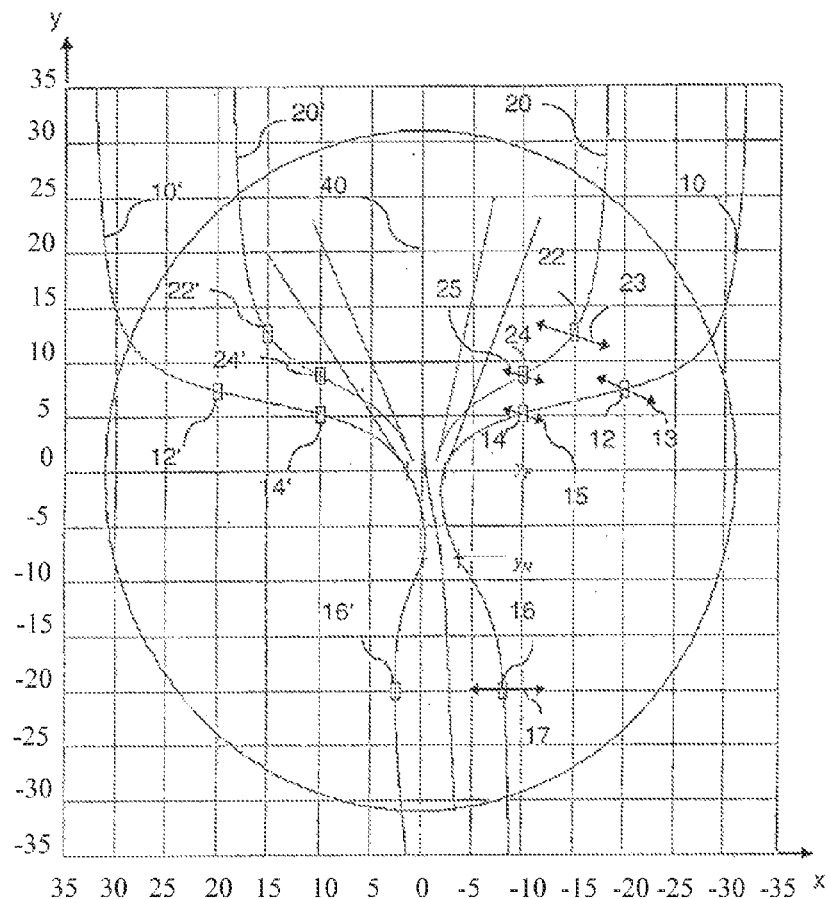
FIG. 1 illustrates construction lines and control points of a first starting design.

According to an aspect of the disclosure herein, a computer-implemented method for creating or calculating a design for a progressive spectacle lens is proposed, comprising:

Specification of a principal line;

specifications for target astigmatism values $A(u=0,y)$ along the principal line; and specifications for the course of at least one base target isoastigmatism line, wherein the course of the base target isoastigmatism line is described by a one-dimensional function of the form $u_G(y)=f(y)$;

calculation of a spatial distribution of the target astigmatism values $A(u,y)$ of the design to be calculated by an interpolation between the target astigmatism values $A(u=0,y)$ on the principal line and the target astigmatism values $A(u_G(y),y)$ on the base target isoastigmatism line, wherein u designates the horizontal distance from the principal line of a point $(u,y)$ of the spectacle lens design;

y designates the vertical coordinate of the point $(u,y)$ of the spectacle lens design;

$u_G(y)$ designates the horizontal distance from the principal line of a point $(u_G(y),y)$ on the base target isoastigmatism line.

According to a further aspect of the disclosure herein, a computer-implemented method for creating or calculating a design for a progressive spectacle lens is provided, comprising:

defining a starting design comprising:
  specification of a principal line;
  specifications for target astigmatism values $A(u=0,y)$ along the principal line; and
  specifications for the course of at least one base target isoastigmatism line, wherein the course of the base target isoastigmatism line is described by a one-dimensional function of the form $u_G(y)=f(y)$;

transforming the starting design, wherein transforming of the starting design comprises
  modifying the course of the base target isoastigmatism line $u_G(y) \rightarrow u'_G(y)$; and
  calculating the target astigmatism values $A(u,y)$ of the design to be calculated by an interpolation between the target astigmatism values $A(u=0,y)$ on the principal line and the target astigmatism values $A(u'_G(y),y)$ on the modified base target isoastigmatism line, wherein u designates the horizontal distance from the principal line of a point (u,y) of the spectacle lens design;

y designates the vertical coordinate of the point (u,y) of the spectacle lens design;

$u_G(y)$ designates the horizontal distance from the principal line of a point $(u_G(y),y)$ on the base target isoastigmatism line;

$u'_G(y)$ designates the horizontal distance from the principal line of a point $(u'_G(y),y)$ on the modified base target isoastigmatism line.

The optimization of progressive spectacle lenses usually takes place by minimizing a target function in which desired or target values for at least one aberration (in particular target values for the astigmatic deviation) of the progressive spectacle lens are taken into account. The desired or target values of the at least one aberration, and in particular of the astigmatic deviation, which are taken into account in the target function, characterize the design of a spectacle lens.

For example, a design-based optimization of a progressive spectacle lens can be performed by minimizing a target function of the form:

$$F(\vec{x}) = \sum_{i=1}^{m} [g_{i,\Delta R}(\Delta R_i - \Delta R_{i,target})^2 + g_{i,Ast}(Ast_i - Ast_{i,target})^2 + \ldots ]$$

In the above formula:

$\Delta R_{i,target}$ is the target value of the local refractive error at the $i^{th}$ evaluation point;

$\Delta R_i$ is the actual local refractive error at the $i^{th}$ evaluation point;

$Ast_{i,target}$ is the target value of the local astigmatic deviation or the local astigmatic error at the $i^{th}$ evaluation point;

$Ast_i$ is the actual local astigmatic deviation or the actual local astigmatic error at the $i^{th}$ evaluation point;

$g_{i,\Delta R}$ is the local weighting of the refractive error at the $i^{th}$ evaluation point;

$g_{i,Ast}$ is the local weighting of the astigmatic deviation or the astigmatic error at the $i^{th}$ evaluation point.

The refractive error represents the difference between the refractive power of the spectacle lens and the refractive power determined by refraction determination. The astigmatic deviation or the astigmatic error represents the difference between the astigmatism of the spectacle lens and the astigmatism determined by refraction determination. Preferably, these are values in the position of wear of the spectacle lens, i.e. taking the system spectacle lens/eye into account.

The spatial distributions of the aberrations $\Delta R_i$ and $\Delta R_{i,target}$ and $Ast_i$ and $Ast_{i,target}$ can be indicated in the form $\Delta R(x,y)$, $\Delta R_{target}(x,y)$ and $Ast(x,y)$ and $Ast_{target}(x,y)$, respectively.

Here, the coordinate system e.g. relates to a coordinate system in the (object-side or eye-side) to-be-optimized surface of the spectacle lens, wherein the origin of the coordinate may coincide with the geometric center of the (raw-round) spectacle lens or with the centration or fitting point of the spectacle lens. The vertical ("y") and horizontal ("x") axes lie in the tangential plane with respect to the respective (eye-side or object-side) surface of the spectacle lens in the geometric center or the centration or fitting point. The vertical direction preferably relates to the vertical direction in the position of wear of the spectacle lens, wherein the spectacle lens is for example disposed in an average position of wear (as is defined e.g. in DIN 58 208 part 2) or in an individual position of wear. Preferably, the spectacle lens is disposed in an individual position of wear. Of course, it is possible to indicate the spatial distribution of the aberrations in other suitable coordinate systems. In particular, it is preferred to indicate the optimization values in the coordinate system of the surface to be optimized with respect to the principal line (wherein u=0 holds on the principal line), and not with respect to the y axis (x=0), i.e. in the form $\Delta R(u,y)$, $\Delta R_{target}(u,y)$, $Ast(u,y)$ und $Ast_{target}(u,y)$. If the target values or the optimization target values are specified with respect to the principal line, it is sufficient, when the position of wear of the spectacle lens to be taken into account is varied, in particular when the pupillary distance, the corneal vertex distance, the forward inclination, the object distance model, etc. are varied, to merely match the principal line to the varied principal line of sight. The target values or the optimization target values are then adjusted automatically.

The spatial distribution of the target values of the aberrations (in particular the astigmatic deviation $Ast_{i,target}$ or $Ast_{target}(x,y)$ or $Ast_{target}(u,y)$) across the spectacle lens, which are taken into account as target values in the optimization of the spectacle lens, and optionally their local weightings ($g_{i,A}$, $g_{i,\Delta R}$) characterize the design of a progressive spectacle lens. Stated differently, the design of a spectacle lens usually comprises the distribution of the target values for one or more aberrations (in particular the astigmatic deviation $Ast_{i,target}$ or $Ast_{target}(x,y)$ or $Ast_{target}(u,y)$) which are taken into account as target values in the optimization of the spectacle lens.

Here, in particular the principal line and the spatial distribution of the target values $Ast_{i,target}$ or $Ast_{target}(x,y)$ or $Ast_{target}(u,y)$ of the astigmatic deviation across the spectacle lens play a central role in the design definition and optimization of progressive spectacle lenses. For example, the classification of the progressive lens design and the assessment of the field of view sizes suitably take place on the basis of the astigmatism distribution. Moreover, a spectacle lens design can also comprise the distribution of the target values for refractive error, magnification error, distortion error or other aberrations. Here, these values can be surface values or preferably wear values, i.e. values in the position of wear of the spectacle lens.

In addition, the spectacle lens design can comprise a suitable object distance model. For example, the object model can comprise an object distance function defined as the reciprocal object distance along the principal line. A standardized object distance model is e.g. indicated in DIN 58 208 part 2 (cf. image 6). However, the object distance model can deviate from this standardized object distance model.

A principal line is understood to be a substantially straight or curved line along which the desired increase of the refractive power of the spectacle lens from the distance to the near portion is achieved. The principal line is substantially centered with respect to the spectacle lens top down, i.e. along a substantially vertical direction. Thus, the principal line constitutes a construction line in the coordinate system of the (object-side or eye-side) to-be-optimized surface for the description of the target values. The course of the principal line of the spectacle lens is selected such that it at least approximately follows the principal line of sight. An exemplary method for matching the principal line to the principal line of sight is described in EP 1 277 079, which is hereby incorporated by reference. A principal line of sight is understood to be the sequence of the penetration points of the main rays through the respective spectacle lens surface when looking at a line lying in the perpendicular plane that splits the distance of the two ocular centers of rotation in half (so-called cyclopean eye plane). The spectacle lens surface may be the object-side or the eye-side surface. The position of the line in the cyclopean eye plane is determined by the selected object distance model.

A progressive spectacle lens design usually comprises a distance, a near and an intermediate or progression zone. The delimitation of the inner zones with good imaging properties against the peripheral zones, in which higher aberrations are allowed, is usually achieved by a stipulated target isoastigmatism line. In eyewear optics, the isoastigmatism line along which the amount of the astigmatism is equal to 0.5 D is mostly used to this end. Preferably, this line is used for the construction of the astigmatism model for the target specifications, as will be described in detail below.

In order to create progressive lenses with different designs (i.e. with different target specifications for the aberrations, in particular for the astigmatic deviation), the corresponding different design or target specifications have to be created or calculated, and the optimization has to be performed afterward. Consequently, creating or calculating a spectacle lens design as defined by this application comprises calculating or creating the target specifications or target values for the individual aberrations associated with the spectacle lens design, in particular the target specifications for the astigmatic deviation or the target astigmatism.

According to the disclosure herein, unlike the usual approach, the new target specifications are derived from deposited, older target specifications. Thus, with the exemplary method, individual progressive lens designs with different widths of the distance and/or the near viewing zone(s) and/or low or high astigmatism gradient can be directly created from an existing progressive lens design (referred to as starting or basic design hereinafter) with known target specifications. Since all design modifications are derived from the same starting design, the transition is smooth. Thus, an arbitrary number of design variations can be created in order to always meet customer needs in the best possible way.

The design modification is performed by a suitable variation of the optimization target specifications of the starting design, in particular of the target values for the astigmatic deviation or target astigmatism values.

To this end, first of all a starting design or starting specifications are defined, which comprise(s)

a specification of a principal line or the course of a principal line;

specifications for target astigmatism values $A_{target}(u=0,y)$ along the principal line; and specifications for the course between a base target isoastigmatism line, wherein the course of the base target isoastigmatism line is described by a one-dimensional function of the form $u_G(y)=f(y)$.

Furthermore, the starting design or the starting specifications preferably comprise(s) specifications for the refractive power course along the principal line. Further parameters of the starting design, such as the maximally admissible target astigmatism in the periphery of the spectacle lens; and/or the maximum target isoastigmatism line; and/or the distances of the maximum target isoastigmatism line from the base target isoastigmatism line in the distance and near portions in a predetermined or predeterminable direction can also be specified.

The spatial distribution of the target astigmatism values $A_{target}(u,y)$ associated with the starting design can be determined by a suitable interpolation on the basis of the above specifications.

Alternatively, the starting design or the starting specifications can comprise the spatial distribution of the target astigmatism values across at least a part of the to-be-optimized region of the spectacle lens. Thus, the course of the principal line, the target astigmatism values along the principal line, the course of the base target isoastigmatism line, and optionally further parameters associated with the starting design are uniquely determined.

Moreover, the starting design or the starting specifications can comprise a starting surface, which is defined by its vertex depths, for example. When the starting surface is specified, the courses of the principal line HL and of the base target isoastigmatism line $I_G$ are uniquely specified as well.

Furthermore, the maximally admissible design modifications can be specified or defined in advance depending on the starting design.

Target astigmatism values A as defined by this application are understood to be in particular the target values of the astigmatic deviation $Ast_{target}$ or the target values for the astigmatism of the spectacle lens (surface astigmatism or astigmatism in the position of wear).

In particular, to construct the astigmatism specifications or to calculate the target astigmatism distribution across the spectacle lens, the course of at least one base target isoastigmatism line, preferably one base target isoastigmatism line on the nasal and temporal sides of the spectacle lens each is indicated. The amount $A_G$ of the base target isoastigmatism line can be selected freely, advantageous amounts being between 0.25 D and 1.0 D, and in particular 0.5 D.

The principal line and the base target isoastigmatism line can be specified mathematically by a suitable parametric representation. For example, the course of the principal line HL can be described by a one-dimensional, preferably continuous function of the form $f_u(y)$. The principal line is defined when the function $f_u(y)$ is specified. Also, the course of the base target isoastigmatism line can be described or specified by a one-dimensional function of the form $u_G(y)=f(y)$.

Preferably, the one-dimensional function $f(y)$ is a function that is at least one time continuously differentiable. Further preferably, the first derivative of the function $f(y)$ is also an at least one time continuously differentiable function.

The principal line and the spatial distribution of the target astigmatism values can be indicated and calculated in a suitable Cartesian coordinate system having a horizontal axis x and a vertical axis y, such as the above-described coordinate system, i.e., for example in a coordinate system in the to-be-optimized surface of the spectacle lens, preferably in the eye-side surface of the spectacle lens, the origin of the coordinate system for example coinciding with the geometric center of the (raw-round) spectacle lens or with the centration or fitting point of the spectacle lens. The vertical ("y") and horizontal ("x") axes lie in the tangential plane with respect to the respective (eye-side or object-side, preferably eye-side) to-be-optimized surface of the spectacle lens at the geometric center or the centration or fitting point. The vertical direction preferably relates to the vertical direction in the position of wear of the spectacle lens, wherein the spectacle lens is for example disposed in an average position of wear (as is defined e.g. in DIN 58 208 part 2) or in an individual position of wear. Preferably, the spectacle lens is disposed in an individual position of wear. In this coordinate system {x,y}, the horizontal coordinate $x_{HL}$ of a point on the principal line $(x_{HL},y)$ can be described by a function of the form $f_u(y)$, i.e. $x_{HL}=f_u(y)$.

However, it has proven advantageous to perform a coordinate transformation $(x,y) \rightarrow (u,y)$, $x=u+f_u(y)$ and u designates the distance of a point (u,y) from the principal line, and to perform all calculations in this coordinate system. In this coordinate system, the points of the principal line have coordinates (u=0,y), the points of the base target isoastigmatism line have coordinates ($u_G(y)$,y), and the points of the modified base target isoastigmatism line have coordinates ($u'_G(y)$,y).

However, it is of course also possible to perform all calculations in the coordinate system {x,y} or in another suitable coordinate system.

In a second step, the course of the base target isoastigmatism line is modified according to a predetermined transformation $\Im(u_G(y))=u'_G(y)$, wherein:

$$A(u_G(y),y)=A(u'_G(y),y)=A_G=\text{const.}$$

In other words, only the course of the base target isoastigmatism line is modified, but not the constant amount $A_G$ of the target astigmatism along the base target isoastigmatism line.

The target astigmatism values are suitably interpolated between the principal line and the modified base target isoastigmatism line. Thus, on the basis of the specifications of the starting design or on the basis of the starting specifications, the spatial distribution of the target astigmatism values between the principal line and the modified base target isoastigmatism line can be determined. For example, the target astigmatism values can be calculated by a linear, quadrangular, or cubic interpolation. A higher-order interpolation is conceivable as well.

An exemplary calculation or creation of a target astigmatism distribution or target astigmatism values on the basis of the predetermined course of a principal line and the predetermined course of a base target isoastigmatism line will be described in detail in the following.

As described above, the course of the predetermined base target isoastigmatism line can be specified by a one-dimensional function $u_G(y)$. Of course, the target astigmatism distribution between the predetermined principal line and the modified base target isoastigmatism line can be calculated as well by the below-described method. In this case, in the following formulae, the one-dimensional function $u'_G(y)$, which describes the course of the modified base target isoastigmatism line $I'_G$, will take the place of the one-dimensional function $u_G(y)$, which describes the course of the base target isoastigmatism line $I_G$.

The target astigmatism values can be interpolated in horizontal sections, wherein the interpolation is performed in each horizontal section between the predetermined target astigmatism value on the principal line $A(u=0,y)=A_0(y)$ and the value $A(u'_G(y),y)=A_G=\text{const}$ on the modified base target isoastigmatism line.

With respect to u, the interpolation can be performed linearly, quadrangularly, or by an arbitrary power function $$A(u,y)=A_0(y)+b(y)u^p$$

In case of the specified power p, the coefficient b(y) can be directly determined by:

$$b(y)=\frac{A_G-A_0(y)}{u_G(y)^p}$$

wherein, as described above, $u_G(y)$ is the horizontal distance of the base target isoastigmatism line from the principal line.

The interpolation can then be written as $$A(u,y)=A_0(y)+\frac{A_G-A_0(y)}{u_G(y)^p}u^p$$

$$=A_0(y)+(A_G-A_0(y))\left(\frac{u}{u_G(y)}\right)^p$$

The power p is generally specified in a variable manner. The greater p is selected to be, the smoother the lateral increase of the astigmatism on the principal line is. In the progression zone, the astigmatism generally increases linearly according to the Minkwitz theorem, so that in this zone p is preferably selected to be 1. As the target astigmatism in the near portion decreases, p preferably increases as well, so that the horizontal increase of the target astigmatism is slower. This leads to an extension of the near portion.

In the periphery of the spectacle lens (i.e. between the base target isoastigmatism line and the spectacle lens rim), the distribution of the target astigmatism can be determined by additionally specifying the outer, maximum target isoastigmatism line with the value $A_{max}$ and by specifying the distances of the maximum target isoastigmatism lines from the base target isoastigmatism line in the distance and near portions.

In particular, the target astigmatism values in the periphery of the spectacle lens can be determined or calculated by so-called parallel curve model methods.

According to this method, parallel curves for the base target isoastigmatism line and further target isoastigmatism lines, which can be substantially parallel to the base target isoastigmatism line, are constructed in the periphery of the spectacle lens. The normal distance of these target isoastigmatism lines is controlled by specifying a largest value $A_{max}$ and the associated distance from the base target isoastigmatism line along the curve normal. The distance of the maximum or outer target isoastigmatism line does not have to be constant and can be specified by a distance function a(y). The greater the value of a(y), the farther away the target isoastigmatism lines are from each other and the smoother the astigmatism transitions. The distance function a(y) may be a simple linear function such that a distance in the distance portion $a_F$ and a distance in the near portion $a_N$ are specified and subsequently interpolated linearly in y.

The target astigmatism value at an arbitrary point P(u,y) in the periphery of the spectacle lens can e.g. be calculated as follows:

1. determining the point $P_G(u_G,y_G)$ on the base target isoastigmatism line, the curve normal of which passes through the point P(u,y), by a suitable numerical method;
2. calculating the distance d of the two points P(u,y) and $P_G(u_G,y_G)$:

$$d=\sqrt{(u-u_G)^2+(y-y_G)^2};$$

3. calculating the associated target astigmatism value $A(u,y)=A(d,a(y_G))$ by an interpolation between $A_G(d=0)$ and $A_{max}(a(y_G))$. Depending on the design, this interpolation can e.g. be a linear, quadrangular, or cubic, or another suitable interpolation. Preferably, the interpolation is linear.

Alternatively, the target astigmatism values in the periphery of the spectacle lens can be calculated according to the so-called truncated cone model method.

This method is particularly advantageous if the base target isoastigmatism line is curved too much when transitioning into the distance zone, so that the curve normals to the base target isoastigmatism line possibly intersect already within the distance a(y). In this case, according to the above-described method, the outer target isoastigmatism lines cannot be constructed clearly any more, since the above method provides more than one solution. The target isoastigmatism lines are modeled as contour lines of a truncated cone, the base area of which is delimited by the target isoastigmatism line. By specifying the position of the tip $S(u_{SP}, y_{SP})$ of the truncated cone and the associated target astigmatism value $A_{SP}$ at the tip, each point $P(u,y)$ is uniquely associated a target astigmatism value according to the below-described method 1. determining the intersection $F(u_F, y_F)$ of the straight line passing through the points P and S and the limiting curve of the truncated cone;
2. calculating the distances:

$$a_{SP} = \sqrt{(u_{SP}-u_F)^2 + (y_{SP}-u_F)^2} \text{ and}$$

$$a_P = \sqrt{(u_P-u_F)^2 + (y_P-u_F)^2};$$

3. calculating the target astigmatism value $A(u,y)$:

$$A_{KS} = A_G + (A_{SP} - A_G)\frac{a_P}{a_{SP}}$$

$$A_{target}(u, y) = A_{target}(p) = \min(A_{KS}, A_{max}).$$

Figure 10:
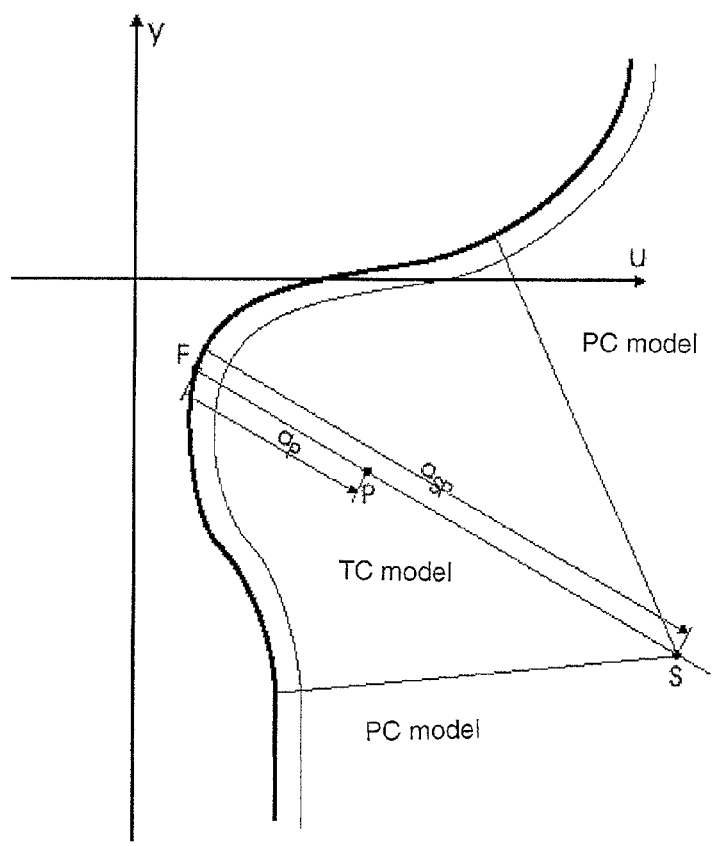
FIG. 10 illustrates a schematic representation of the calculation of the target astigmatism values in the periphery of a spectacle lens.

FIG. 10 illustrates the calculation of the target astigmatism values in the periphery of the spectacle lens according to the parallel curve model method (referred to as PC model in FIG. 10) and according to the truncated cone model method (referred to as TC model in FIG. 10).

Preferably, in the central region of the spectacle lens, the truncated cone model method is applied for calculating the target astigmatism values in the periphery, and the parallel curve model method is applied in the distance and near portions.

Thus, with the method disclosed herein, a spectacle lens designer can create or vary arbitrary progressive lens designs or arbitrary distributions of the target astigmatism in a fast and efficient way. In particular, with the disclosed method, it is possible to quickly and efficiently modify the design characteristics for an existing progressive lens design (starting or basic design) and to tailor it to customer needs. Moreover, by a relatively simple and fast calculation, it is possible to create variants or designs with larger or smaller viewing zones (e.g. with large or small distance portion, wide or narrow near portion), with low or high astigmatism gradients. Thus, an essential advantage is that the above-described additional effort for creating suitable target specifications, in particular for individual progressive spectacle lenses, can be avoided. A further advantage is the possibility to arbitrarily and infinitely adjust the viewing zones within the scope of predetermined limits without the design characteristics and the good imaging properties of the starting design getting lost. Thus, an arbitrary number of design variants can be created in order to always meet customer needs in the best possible way. Furthermore, with the approach according to the disclosure herein, the coefficients for creating the target specifications can be adapted on the basis of additional parameters only shortly before the optimization of a spectacle lens. Therefore, it is possible to quickly derive suitable application design from a basic or starting design. Since different design variants can be created quickly and efficiently and tested against each other with the disclosed method, the effort for developing and creating conventional, power-optimized or individual progressive spectacle lenses can be reduced significantly.

The exemplary method is preferably suitable for a calculation process that is controlled by a database.

Further, the disclosed method is particularly suitable for generating individual designs adapted to different fields of application, such as:
progressive lenses with a large, wide distance portion for drivers;
sports progressive lenses with a large distance portion, reduced addition, and small gradients (lenses for dynamic activities);
lenses with a wide near portion and a main focus of work of 40 cm;
diverse computer workplace lenses as well as near and room lenses, as well as for creating individual spectacle lenses on the basis of the generated design.

The base target isoastigmatism line $u_G(y) = f(y)$ can be divided into different zones. Preferably, the base target isoastigmatism line is divided into three zones (distance zone, progression zone, and near zone) by specifying two vertical coordinates $y_F$ and $y_N$.

In the progression zone (i.e. when $y_N \leq y \leq y_F$), the course of the base target isoastigmatism line can be specified directly or be calculated e.g. either according to the Minkwitz theorem with a predetermined refractive power course along the principal line, or from a predetermined starting surface, which is e.g. comprised in the starting design. In particular, according to the Minkwitz theorem, the lateral increase of the astigmatism can be determined by the refractive power increase along the principal line. Thus, also the horizontal distances of the points of the border line from the principal line or the u coordinates of the base target isoastigmatism line can be determined.

In the distance and/or near portion(s), the continuation or the course of the base target isoastigmatism line can be specified independently or be modified freely and infinitely (within certain predetermined limits), and thus the design specification can be made.

Preferably, the base target isoastigmatism line is not transformed in the progression zone (i.e. when $y_N \leq y \leq y_F$). Thus, the derived individual design keeps the characteristic features of the refractive power course and the minimum width of the progression channel of the starting design associated therewith.

Further preferably, the starting design further comprises a specification for the course of an additional target isoastigmatism line in the distance and/or near portion(s) or zone(s), wherein the course of the additional target isoastigmatism line is described by a one-dimensional function of the form $u_Z(y) = f_Z(y)$. The transformation of the starting design further comprises modifying the course of the additional target isoastigmatism line of the starting design, wherein the interpolation between the target astigmatism values on the principal line and the target astigmatism values on the modified base target isoastigmatism line comprises an interpolation between the target astigmatism values $A(u=0,y)$ on the principal line and the target astigmatism values $A(u'_Z(y),y)$ on the modified additional target isoastigmatism line; and an interpolation between the target astigmatism values on the modified additional target isoastigmatism line $A(u'_Z(y),y)$ and the target astigmatism values on the modified base target isoastigmatism line $A(u'_G(y),y)$, wherein:

$u_Z(y)$ designates the horizontal distance from the principal line of a point $(u_Z(y),y)$ on the additional target isoastigmatism line of the starting design; and $u'_Z(y)$ designates the horizontal distance from the principal line of a point $(u'_Z(y),y)$ on the modified additional target isoastigmatism line.

Preferably, the one-dimensional function $f_z(y)$ is at least one time continuously differentiable.

The course of the additional target isoastigmatism line of the starting design can be according to a predetermined transformation $\Im_z(u_z(y))=u'_z(y)$ wherein $A(u_z(y),y)=A(u'_z,y)=A_z=\text{const}$.

Particularly in the distance portion, the interpolation can be controlled more finely by an additional, second target isoastigmatism line (e.g. $I_{z=0.25}$ or $A_z=0.25$ D). In this case, an interpolation is performed at first between the principal line and the second, additional target isoastigmatism line, and subsequently between the second, additional target isoastigmatism line and the base target isoastigmatism line. The additional, second target isoastigmatism line can be specified and calculated or modified by analogy with the base target isoastigmatism line. The interpolation between the target astigmatism values $A(u=0,y)$ on the principal line and the target astigmatism values $A(u'_z(y),y)$ on the modified additional target isoastigmatism line is performed by analogy with the interpolation between the target astigmatism values $A(u=0,y)$ on the principal line and the target astigmatism values $A(u'_G(y),y)$ on the modified base target isoastigmatism line.

Preferably, the base target isoastigmatism line passes through a first predetermined or predeterminable control point $\vec{r}_1=(u_1,y_1)$. Modifying the course of the base target isoastigmatism line comprises:

shifting the first control point $\vec{r}_1 \rightarrow \vec{r}'_1(u'_1,y'_1)$ along a predetermined or predeterminable curve; and calculating the modified base target isoastigmatism line such that it passes through the shifted first control point $\vec{r}'_1(u'_1,y'_1)$.

The predetermined or predeterminable curve $u \rightarrow y$, $K:u \rightarrow k(u)$, along which the first control point is shifted, can be an arbitrary curve. Preferably, the curve is a straight line.

Moreover, the base target isoastigmatism line can pass through a second predetermined or predeterminable control point $\vec{r}_2=(u_2,y_2)$, wherein modifying the course of the base target isoastigmatism line further comprises:

shifting the second control point $\vec{r}_2 \rightarrow \vec{r}'_2(u'_2,y'_2)$ along a predetermined or predeterminable curve; and calculating the modified base target isoastigmatism line such that is passes through the shifted second control point $\vec{r}'_2(u'_2,y'_2)$.

Likewise, the curve, along which the second control point is shifted, can be an arbitrary curve. Preferably, this curve is a straight line.

It is also possible for the base target isoastigmatism line to pass through further control points. The further control points can be shifted along corresponding predetermined or predeterminable curves, wherein the modified base target isoastigmatism line is calculated such that it passes through the shifted control points.

Further preferably, the base target isoastigmatism line and the modified base target isoastigmatism line pass through at least one predetermined or predeterminable pivotal or fixed point $\vec{r}_0=(u_0,y_0)$, wherein the conditions:

$$u_G(y_0) = u'_G(y_0)$$

$$\frac{du_G(y_0)}{dy} = \frac{du'_G(y_0)}{dy}$$

are met in the pivotal or fixed point.

The first and optionally further control points can be shifted freely e.g. depending on the individual preferences of the spectacle wearer, or automatically on the basis of collected individual customer data, such as customer preferences, weightings of the individual preferences, focuses of use, frame characteristics and/or other parameters. Preferably, the maximum, admissible outward (i.e. toward the principal line) and/or inward (i.e. toward the periphery of the spectacle lens or the spectacle lens rim) shift of the respective control point is specified.

The orientation of the curves and in particular the straight line, along which the respective control point can be shifted, can be an arbitrary one. Preferably, the straight line, along which the respective control point moves or can move, coincides with the curve normals.

From the data relating to the position of the shifted control point or control points as well as optionally on the basis of data relating to the course of the base target isoastigmatism line in the progression zone, the parameters of the modified base target isoastigmatism line and thus the course of the modified base target isoastigmatism line can be uniquely determined. Since the central zone of the base target isoastigmatism line (i.e. the progression zone) is derived from the refractive power course along the principal line, with a suitable parametric representation of the base target isoastigmatism line, usually one or two control points in the distance and/or near portion(s) each are sufficient to correspondingly modify the course of the base target isoastigmatism line or to uniquely determine the course of the modified base target isoastigmatism line.

Thus, it is possible to modify the size of the viewing zones e.g. depending on the individual customer preferences, ranges of use of the spectacle lens (sports, reading, etc.) and/or other individual customer parameters and to tailor them to the respective individual situation of wear in a simple and efficient way.

For example, if the near portion is to be broadened, the control points in the near portion can be shifted further outward and vice versa. If a very balanced spectacle lens design is to be created, the control points can be shifted slightly inward. For example, if a sports design with a large, broad distance portion is to be created from a balanced starting design with an arctangent representation, then the near portion width is reduced and the distance portion is enlarged maximally. In addition, it is possible to switch from the arctangent representation to a different representation, e.g. a polynomial representation, in order to not have lateral field of sight restrictions for large frames, for example.

The maximally admissible design variation can be defined in advance depending on the starting design.

In the following, the procedure for shifting a control point will be explained in detail with reference to the near portion control point.

In this example, the near portion control point $\vec{r}_1=(u_1,y_1)$ is shifted outward (i.e. toward the periphery) or inward (i.e. toward the principal line) along a straight line:

$$\vec{r}'_1 = \vec{r}_1 + t\vec{v}_a$$

$$\vec{r}'_1 = \vec{r}_1 + t\vec{v}_i$$

wherein:

$\vec{v}_a$ designates the direction vector outward of the straight line, along which the near portion control point moves or can move; and $\vec{v}_i$ designates the direction vector inward of the straight line, along which the near portion control point moves or can move; and t designates the shift along the straight line with the direction vector $\vec{v}_{a,i}$.

Of course, it is possible to correspondingly shift the control point along other curves.

Here, the shift t and thus the field of view sizes can be limited, wherein $t_a$ designates the maximally admissible outward deviation and $t_i$ designates the maximally admissible inward deviation. A maximum field of view size, e.g. in the near portion, then means that the control point $\vec{r}_1$ is shifted fully outward (i.e. toward the periphery) along the straight line $\vec{v}_a$ ($\vec{r}'_1 = \vec{r}_1 + t\vec{v}_a$). A minimum field of view size, e.g. in the near portion, accordingly means that the control point $\vec{r}_1$ is shifted fully inward (i.e. toward the principal line) along the straight line $\vec{v}_i$ ($\vec{r}_1 = \vec{r}_1 + t\vec{v}_i$).

When the position of the control points of the individual design has been specified, the base target isoastigmatism line is modified such that it passes through the transformed or shifted control points or control points. After the control points and thus the course of the base target isoastigmatism line have been modified, the target specifications for the astigmatism distribution are determined or calculated by an interpolation, as has been described above.

The base target isoastigmatism line can be described by a number of suitable, one-dimensional, preferably at least one time continuously differentiable functions f(y). Surprisingly, it was found that the function f(y) can be described already by a few, variable parameters in a suitable way, which significantly simplifies and accelerates the calculation and transformation of the starting design.

Preferably, the course of the base target isoastigmatism line in the near portion or zone is described or specified by the function:

$$u_G(y) = a_n + \frac{b_n}{y} + \frac{c_n}{y^2} + \frac{d_n}{y^3}$$

with the parameters or coefficients $a_n, b_n, c_n, d_n$.

In the distance portion, the course of the base target isoastigmatism line is preferably described or specified by an $n^{th}$-order polynomial:

$$u_G(y) = a_f + b_f y + c_f y^n$$

with the parameters or coefficients $a_f, b_f, c_f$ (in the following also referred to as polynomial representation in short).

A function of this type is particularly suitable to describe a hard design.

Alternatively, in the distance portion, the course of the base target isoastigmatism line can be described or specified by the function:

$$u_G(y) = a + b\left(\text{atan}\left(\frac{y-c}{d}\right) + \frac{\pi}{2}\right)$$

with the parameters or coefficients a, b, c, d (in the following also referred to as an arctangent representation in short). Such a function is particularly suitable to describe a soft design.

In the following, the modification of the base target isoastigmatism line in the near portion will be explained in detail by way of example.

As has been stated above, the base target isoastigmatism line in the near portion can e.g. be described by a function of the form:

$$u_G(y) = a_n + \frac{b_n}{y} + \frac{c_n}{y^2} + \frac{d_n}{y^3}$$

with the parameters or coefficients $a_n, b_n, c_n, d_n$.

The first derivative of this function is $$\frac{du_G(y)}{dy} = -\frac{b_n}{y^2} - \frac{2c_n}{y^3} - \frac{3d_n}{y^4}.$$

The base target isoastigmatism line passes through a first predetermined or predeterminable control point $\vec{r}_n(u_n, y_n)$ in the near portion. This point is shifted as described above $\vec{r}_n(u_n, y_n) \rightarrow \vec{r}'_n(u'_n, y'_n)$.

Accordingly, the modified base target isoastigmatism line has the form:

$$u'_G(y) = a'_n + \frac{b'_n}{y} + \frac{c'_n}{y^2} + \frac{d'_n}{y^3}.$$

The parameter or coefficient $a_n = a'_n$ is preferably determined or defined in a suitable way.

Preferably, the course of the base target isoastigmatism line in the progression zone, which extends between a vertical coordinate $y_N$ (on the border of the near zone) and a vertical coordinate $y_F$ (on the border of the distance zone), is not modified, so that in this zone (i.e. between $y_N$ and $y_F$) the base target isoastigmatism line of the starting design and the base target isoastigmatism line of the derived, individual design coincide. The point $(u, y=y_N)$ constitutes a pivotal or fixed point.

Since the course of the base target isoastigmatism line of the starting design is predetermined, there can be calculated, on the basis of the data of the course of the base target isoastigmatism line of the starting design in the progression zone determined by the distance u of the base target isoastigmatism line from the principal line, the first derivative at $y=y_N$.

On the basis of this data and the data of the coordinates of the shifted control point (i.e. $u'_G$ in point $\vec{r}_n'$) the remaining parameters of the modified base target isoastigmatism line and thus the course of the modified base target isoastigmatism line in the near zone can be uniquely calculated by solving the following system of linear equations:

$$u'_G(y=y_N) = u_G(y=y_N)$$

$$\frac{du'_G(y=y_N)}{dy} = \frac{du_G(y=y_N)}{dy}$$

$$u'_G(y=y'_n) = u'_n = a'_n + \frac{b'_n}{y'_n} + \frac{c'_n}{y'^2_n} + \frac{d'_n}{y'^3_n}$$

The course of the base target isoastigmatism line in the distance portion of a hard design can usually also be modified by specifying and manipulating a control point. In particular, the base target isoastigmatism line in the distance portion can be described by a function:

$$u_G(y) = a_f + b_f y + c_f y^n.$$

with the parameters or coefficients $a_f$, $b_f$, $c_f$.

The first derivative of this function is:

$$\frac{du_G(y)}{dy} = b_f + n c_f y^{n-1}.$$

The base target isoastigmatism line has a first predetermined or predeterminable control point $\vec{r}_f(u_f, y_f)$ in the distance portion. This point is shifted as described above: $\vec{r}_f(u_f, y_f) \to \vec{r}'_f(u'_f, y'_f)$. The point $(u, y = y_F)$ constitutes a pivotal or fixed point.

The modified base target isoastigmatism line has the form:

$$u'_G(y) = a'_f + b'_f y + c'_f y^n.$$

The power n of the polynomial is usually specified or suitably defined.

The parameters or coefficients of the modified base target isoastigmatism line can be uniquely determined by solving the following system of equations, for example, wherein in the progression zone the course of the base target isoastigmatism line remains unchanged:

$$u'_G(y = y_F) = u_G(y = y_F)$$
$$\frac{du'_G(y = y_F)}{dy} = \frac{du_G(y = y_F)}{dy}$$
$$u'_G(y = y'_f) = u'_f = a'_f + b'_f + y'_f + c'_f + y'^n_f$$

For a distance portion of a soft design described by a function of the form $$u_G(y) = a + b\left(\mathrm{atan}\left(\frac{y-c}{d}\right) + \frac{\pi}{2}\right)$$

with the parameters or coefficients a, b, c, d, usually two predetermined control points $\vec{r}'_{f1}(u_{f1}, y_{f1})$ and $\vec{r}_{f2}(u_{f2}, y_{f2})$ in the distance portion or zone are sufficient to uniquely determine the course of the modified base target isoastigmatism line. The two control points are shifted as described above:

$$\vec{r}_{f1}(u_{f1}, y_{f1}) \to \vec{r}'_{f1}(u'_{f1}, y'_{f1})$$

$$\vec{r}_{f2}(u_{f2}, y_{f2}) \to \vec{r}'_{f2}(u'_{f2}, y'_{f2})$$

The parameters or coefficients a', b', c', d' of the modified base target isoastigmatism line and thus their course in the distance portion can be uniquely determined by solving the following system of equations:

$$u'_G(y = y_F) = u_G(y = y_F)$$
$$\frac{du'_G(y = y_F)}{dy} = \frac{du_G(y = y_F)}{dy}$$

$$u'_G(y = y'_{f1}) = u'_{f1} = a' + b'\left(\mathrm{atan}\left(\frac{y'_{f1} - c'}{d'}\right) + \frac{\pi}{2}\right)$$

$$u'_G(y = y'_{f2}) = u'_{f2} = a' + b'\left(\mathrm{atan}\left(\frac{y'_{f2} - c'}{d'}\right) + \frac{\pi}{2}\right),$$

wherein the point $y = y_F$ is a pivotal or fixed point.

The course of the base target isoastigmatism line can be suitably modified e.g. directly, or manually, by the spectacle lens designer, or automatically on the basis of individual data of the spectacle wearer in order to obtain an optimum adaptation of the viewing zones (e.g. distance and/or near zone(s)) to the individual requirements of the respective spectacle wearer. Preferably, as described above, the course of the base target isoastigmatism line is modified by modifying the position of at least one control point, wherein the position of the at least one control point is modified on the basis of individual data of the spectacle wearer.

The individual data of the spectacle wearer, which is taken into account when modifying the course of the base target isoastigmatism line or the position of the control points, preferably comprises data relating to the weighting of the distance and near zones and/or
the focuses of use of the spectacles and/or
frame and centration data.

In particular, the course of the base target isoastigmatism line or the position of the at least one control point can be transformed automatically on the basis of individual preferences and needs of the spectacle wearer, such as preferences with respect to the sizes of the distance and/or near zone(s), weighting of the viewing zones (distance, near, and intermediate or progression zones), focuses of use and/or frame and centration data, in particular vertical lens size and centering height, frame shape).

When the position of the control points of the individual design has been specified, the course of the base target isoastigmatism line is modified such that it passes through the shifted control point or control points.

The individual data of the spectacle wearer, which is taken into account when determining or calculating the course of the modified base target isoastigmatism line or the position of the at least one control point, can further comprise one or more of the following data or sets of data:

data relating to the main use of the spectacle lens (e.g. driving, computer workplace, reading, craftwork, etc.); and/or data relating to the spectacle lens worn so far, in particular as to whether the previous spectacle lens is a single-vision, bifocal or progressive spectacle lens, data relating to the design (hard/soft), the progression length, the type (individual, conventional), the material (plastics/silicate), the refractive index, the location of the reference points, the addition of the previous spectacle lenses, and/or the change of the refraction data in comparison to the refraction data of the previous spectacle lens, and/or data relating to the desired improvements with respect to the so-far worn spectacles, in particular larger distance zone, larger intermediate zone, larger near zone, less infraduction when reading or reduced rocking motion; and/or data relating to environmental influences (brightness of the surrounding, etc.); and/or refraction data or power parameters, in particular sphere, cylinder, cylinder axis, addition; and/or individual parameters of the spectacle wearer and the individual position of wear of the spectacle lens or the spectacles in front of the eyes of the spectacle wearer. The individual parameters comprise in particular the pupillary distance, the corneal vertex distance (CVD), forward inclination (FI), face form angle (FFA), etc.; and/or data relating to the main directions of sight distance and near, data relating to potentially present, individual, exceptional head and body postures; and/or physiological parameters, in particular of the eye or the eyes of the spectacle wearer, in particular visus with correction, threshold of stereopsis; and/or data relating to the individual object distances, in particular working distance when reading (near work), working distance in the distance; and/or data relating to the object distances in the refraction determination: distance and near.

Moreover, the individual data of the spectacle wearer can comprise further individual parameters.

Preferably, the method further comprises a step of obtaining individual parameters of the spectacle wearer.

The individual data of a spectacle wearer, i.e. the individual parameters and/or the individual needs of a spectacle wearer, can be obtained in great detail e.g. with a consulting tool, such as "Consulting FreeSign" by the company Rodenstock GmbH. Preferably, the customer is directly demonstrated the possible individual design suggestions or design realizations. So far, the realization of the individual customer needs with respect to the viewing zones in corresponding flexible lens design has not been solved sufficiently. Usually, special designs, such as "Impression Sport extracurved" by the company Rodenstock GmbH, had to be used, which do not cover all near distances and base curves though. With the disclosure herein, it is possible to emphasize individual viewing zones by modifying the target specifications in a targeted way. For example, a lateral extension of the near zone can be performed, which may be combined with a reduction of the distance zone or an increase of the gradients of the target isoastigmatism lines in the distance and/or near zone(s)—depending on the requirements profile of the customer (high weighting dynamic or distance portion).

Preferably, the transformation of the starting design further comprises a transformation (e.g. stretching or compression in a vertical direction) of the target astigmatism values, calculated by interpolation, depending on the variably adjustable, (individual) vertical position of the distance and/or near reference point(s), which is performed such that the spectacle lens design to be calculated exhibits the required, vertical position of the distance and/or near reference point(s). Such a transformation is described in the patent application PCT/EP 2008/000585, which is hereby incorporated by reference.

Here, a spectacle lens design exhibits a predetermined spatial position of the distance and/or near reference point(s) when the prescribed values or the values required for the spectacle wearer for the distance and/or near portion power(s) (which are e.g. determined by refraction determination) are achieved in the respective reference point. Put differently, the aberrations (in particular astigmatic deviation and refractive error) associated with the design are to be as small as possible (preferably substantially zero) in the distance and/or near reference point(s).

Thus, in addition, a progressive lens design with an arbitrary position of the reference points for distance and near (distance and near reference points) and main viewing zones can be derived and optimized maintaining the design characteristics of the starting design. To this end, it is sufficient to merely specify the desired individual position of the reference points for distance $B_F$ and near $B_N$. The vertical position and length of the progression zone of the progression surface are automatically adapted to the individual user situation. Here, an arbitrary position of the reference points for distance $B_F$ and near $B_N$ can be taken into consideration in the optimization.

Similarly, other target specifications of the starting design (e.g. target specifications for the refractive error, magnification, etc.) can be transformed or changed in a suitable way.

Likewise, the starting design can further comprise a specification for an object distance function along the principal line of the spectacle lens. Preferably, the method for calculating an individual design further comprises a suitable transformation of the object distance function of the starting design. Preferably, the transformation coefficients of the transformation of the object distance function are determined by a Newton iteration such that the refractive power of the spectacle lens in the distance and/or near reference point(s) of the individual spectacle lens design corresponds to the refractive power of the spectacle lens in the distance and/or near reference point(s) of the starting design. A suitable transformation of the object distance function is described in the above-mentioned patent application PCT/EP 2008/000585.

Further preferably, the transformation of the starting design further comprises multiplication of the target astigmatism values by a scaling factor $1/l_D$, with a function $h=h(S'(y'), l_D/l)$ or with a function $h=h(l_D/l)$, wherein $l$ designates the progression length of the individual spectacle lens design and $l_D$ designates the progression length of the starting design. Preferably, $h(l_D/l)=a\cdot(l_D/l)+b$, wherein a,b are constants.

In addition, the transformation of the starting design can further comprise multiplication of the target astigmatism values (start target astigmatism values or the target astigmatism values determined by interpolation) by a scaling factor:

$$s = t\frac{\text{Add}}{\text{Add}_B}.$$

wherein:

t designates a factor that generally is a function $t=t(\text{Add},F,\text{Add}_B)$ of the addition Add of the spectacle lens or spectacle lens design to be calculated and/or of the distance power F and/or a predetermined base addition $\text{Add}_B$, wherein $t=1$ holds for $\text{Add}=\text{Add}_B$. In the simplest case, $t=1$.

For example, the starting design can comprise a start target astigmatism distribution for the base addition $\text{Add}_B$. First of all, this start target astigmatism distribution can be rescaled to obtain a target astigmatism distribution for an addition Add, wherein Add is the addition of the spectacle lens or spectacle lens design to be calculated. Subsequently, the course of the base target isoastigmatism line can be changed as described above, and a modified target astigmatism distribution adapted to the new course of the base target isoastigmatism line can be determined by interpolation.

A transformation of a predetermined target astigmatism distribution with a base addition $\text{Add}_B$ by multiplication by a scaling factor s is described in the patent application DE 10 2008 105 189.0.

The disclosed method is suitable both for creating designs or design variants for conventional and power-optimized progressive spectacle lenses and for creating designs or design variants for individually optimized progressive spectacle lenses.

With the method for creating or calculating a design for a progressive spectacle lens disclosed herein, an arbitrary number of designs can be derived from a balanced starting design (e.g. a universal design, a near design, etc.) already with few parameters, wherein the transitions are smooth. In a preferred embodiment, all designs derived from the starting design preferably keep the same characteristic features of the refractive power course along the principal line and thus additionally also the minimum width in the progression channel. Consequently, it is possible to afterward create almost all conceivable combinations of field of view sizes and gradient courses without having to create a new design for the complete power range. Since with the procedure according to the disclosure herein, the basic or starting designs do not have to be modified directly, but the coefficients for creating the target specifications have to be adapted only shortly before the optimization on the basis of the additional parameters, suitable application designs can be quickly derived therewith. In particular, the disclosed method is particularly suitable for a calculation process controlled by a database. Since different design variants can be created quickly and efficiently and tested against each other with the exemplary method, the effort for developing and creating conventional, power-optimized or individual progressive spectacle lenses can be reduced significantly.

In addition, an adaptation to the freely definable positions of the near and/or distance reference point(s) of the spectacle wearer and thus to different progression lengths can be performed. In particular, the existing optimization specifications or the existing starting design can be stretched and compressed arbitrarily and thus adapted to the individual situation of wear and in particular to an individually determined progression length. Here, no interpolation of the target specifications of different designs (e.g. different starting design having different progression lengths) is required. Thus, variants with different (longer or shorter) progression zones or progression lengths can additionally be created quickly and efficiently from an existing starting design.

It is also possible to perform an additional, automatic adaptation of the object distance function and thus an automatic adaptation of the target refractive power course.

The calculated spectacle lens design can be a spectacle lens design for a progressive spectacle lens with an object-side or preferably eye-side progressive surface. The opposite surface can preferably be a simple spherical or rotationally symmetric aspherical surface. It is also possible to calculate or create a design for a double-progressive spectacle lens using the above-described method.

Furthermore, an apparatus for creating or calculating a design for a progressive spectacle lens is provided, comprising design calculating means adapted to perform a preferred method for creating or calculating a design for a progressive spectacle lens.

According to an aspect, the apparatus for creating or calculating a design for a progressive spectacle lens comprises
  target specification obtaining means adapted to obtain
    a principal line;
    specifications for target astigmatism values $A(u=0,y)$ along the principal line; and
    specifications for the course of at least one base target isoastigmatism line, wherein the course of the base target isoastigmatism line is described by a one-dimensional function of the form $u_G(y)=f(y)$;
  calculating means adapted to calculate a spatial distribution of the target astigmatism values of the design to be calculated by an interpolation between the target astigmatism values $A(u=0,y)$ on the principal line and the target astigmatism values $A(u_G(y),y)$ on the base target isoastigmatism line.

wherein:
u designates the horizontal distance from the principal line of a point (u,y) of the spectacle lens design;
y designates the vertical coordinate of the point (u,y) of the spectacle lens design;
$u_G(y)$ designates the horizontal distance from the principal line of a point $(u_G(y),y)$ on the base target isoastigmatism line.

According to a further aspect, the apparatus for creating or calculating a design for a progressive spectacle lens comprises design transformation means adapted to perform a transformation of a predetermined starting design, the starting design comprising:
  a specification of a principal line;
  specifications for target astigmatism values $A(u=0,y)$ along a principal line; and
  specifications for the course of at least one base target isoastigmatism line, and wherein the course of the base target isoastigmatism line is described by a one-dimensional function of the form $u_G(y)=f(y)$;
the design transformation means comprising:
  calculating means adapted to perform a modification of the course of the base target isoastigmatism line $u_G(y) \rightarrow u'_G(y)$; and
  calculating means adapted to perform a calculation of the target astigmatism values $A(u,y)$ of the design to be calculated by an interpolation between the target astigmatism values $A(u=0,y)$ on the principal line and the target astigmatism values $A(u'_G(y),y)$ on the modified base target isoastigmatism line,
and wherein
u designates the horizontal distance from the principal line of a point (u,y) of the spectacle lens design;
y designates the vertical coordinate of the point (u,y) of the spectacle lens design;
$u_G(y)$ designates the horizontal distance from the principal line of a point $(u_G(y),y)$ on the base target isoastigmatism line;
$u'_G(y)$ designates the horizontal distance from the principal line of a point $(u'_G(y),y)$ on the modified base target isoastigmatism line.

Furthermore, the apparatus for creating or calculating a design for a progressive spectacle lens preferably comprises obtaining means adapted to obtain individual data of the spectacle wearer.

The starting design or the starting specifications (comprising the specifications for the principal line, for the target astigmatism values along the principal line, for the course of at least one base target isoastigmatism line, and optionally other parameters) can be stored in a memory permanently or temporarily. The design calculating and/or design transformation means, which in particular can comprise calculating means for modifying the course of the base target isoastigmatism line, and/or the calculating means for creating or calculating a target astigmatism distribution and/or their spatial distribution, can be implemented by correspondingly configured or programmed conventional computers, specialized hardware and/or computer networks or computer systems. The design calculating and/or design transformation means and in particular the calculating means for modifying the course of the base target isoastigmatism line and/or the calculating means for creating or calculating a target astigmatism distribution and/or their spatial distribution can be in signal communication with the memory by suitable interfaces and in particular read out and/or modify the data stored in the memory. The control point changing means can further comprise an interactive graphical user interface (GUI), which allows a user to change the positions of the control points.

Further provided is a computer program product, i.e. a computer program claimed in the claim category of an apparatus, and a storage medium with a computer program stored thereon, the computer program being adapted, when loaded and executed on a computer, to perform a preferred method as disclosed herein for creating or calculating a design for a progressive spectacle lens as described above.

According to the disclosure herein, a method for creating a progressive spectacle lens is further proposed, the method comprising:

calculating a design for the spectacle lens according to a preferred method for creating or calculating a design; and calculating or optimizing the spectacle lens on the basis of the calculated spectacle lens design.

The creation method further comprises:

providing surface data of the calculated or optimized spectacle lens; and manufacturing the spectacle lens according to the provided surface data of the spectacle lens.

The manufacture or production can be performed by numerically controlled CNC machines, by a casting method, a combination of the two methods, or according to another suitable method.

Preferably, the calculating or optimization of the spectacle lens is further performed taking individual data of the spectacle wearer into account.

Further, an apparatus for creating a progressive spectacle lens is further provided, comprising:

design calculating means adapted to calculate a design for the spectacle lens according to a preferred method for creating or calculating a design; and optimizing or calculating means adapted to perform a calculation or optimization of the spectacle lens on the basis of the calculated design.

According to one aspect, the design calculating means comprise:

starting specification obtaining means adapted to obtain a principal line;

specifications for target astigmatism values $A(u=0,y)$ along the principal line; and specifications for the course of at least one base target isoastigmatism line, wherein the course of the base target isoastigmatism line is described by a one-dimensional function of the form $u_G(y)=f(y)$;

calculating means adapted to calculate a spatial distribution of the target astigmatism values of the design to be calculated by an interpolation between the target astigmatism values $A(u=0,y)$ on the principal line and the target astigmatism values $A(u_G(y),y)$ on the base target isoastigmatism line.

According to a further aspect, the design calculating means comprise calculating means adapted to perform a modification of the course of the base target isoastigmatism line $u_G(y) \rightarrow u'_G(y)$; and calculating means adapted to perform a calculation of the target astigmatism values $A(u,y)$ of the design to be calculated by an interpolation between the target astigmatism values $A(u=0,y)$ on the principal line and the target astigmatism values $A(u'_G(y),y)$ on the modified base target isoastigmatism line.

The optimizing or calculating means as well as the design calculating and/or design transformation means can be implemented by suitably configured or programmed computers, specialized hardware and/or computer networks or computer systems, etc. It is possible for the same computer or the same computer system to be configured or programmed such as to perform both the calculation of the design for the spectacle lens and the calculation or optimization of the spectacle lens on the basis of the calculated design. However, it is also possible for the calculation of the design and the calculation of the spectacle lens to be performed on the basis of the calculated design in separate calculating units, for example in separate computers or computer systems.

Furthermore, the apparatus for creating a progressive spectacle lens preferably comprises machining means for finishing the spectacle lens. The machining means can comprise e.g. CNC machines for direct machining of a blank according to the determined optimization specifications. Preferably, the finished spectacle lens has a simple spherical or rotationally symmetric aspherical surface and a progressive surface optimized on the basis of the individual design specifications calculated according to the disclosure herein and individual parameters of the spectacle wearer. Preferably, the spherical or rotationally symmetric aspherical surface is the front surface (i.e. the object-side surface) of the spectacle lens. Of course, it is also possible to arrange the surface optimized on the basis of the calculated design as the front surface of the spectacle lens. It is also possible for both surfaces of the spectacle lens to be progressive surfaces.

Preferably, the apparatus for creating a progressive spectacle lens further comprises obtaining means for obtaining individual data of the spectacle wearer, which in particular comprises data relating to the individual dioptric power of the spectacle lens individually required for the spectacle wearer.

Further provided is a computer program product (i.e. a computer program claimed in the claim category of an apparatus) and a storage medium with a computer program stored thereon, the computer program being adapted, when loaded and executed on a computer, to perform a preferred method for calculating and optimizing a progressive spectacle lens, the method comprising the following steps:

calculating a spectacle lens design according to a preferred method disclosed herein for creating or calculating a design for a progressive spectacle lens;

calculating or optimizing the spectacle lens on the basis of the calculated spectacle lens design.

There is further proposed a use of a spectacle lens, produced according to a preferred production method, in a predetermined average or individual position of wear of the spectacle lens in front of the eyes of the specific spectacle wearer, for correcting a visual defect of the spectacle wearer.

Exemplary embodiments of the disclosure herein will be described by way of example in the following description with reference to the figures.

The coordinate system of FIGS. 1, 3, 5, and 7 relates to a Cartesian coordinate system $\{x,y\}$ of the eye-side progressive surface, as defined above. The coordinate center coincides with the geometric center of the spectacle lens. The corresponding target astigmatism distributions (FIGS. 2, 4, 6, and 8) are illustrated in the same coordinate system, wherein merely the x axis is mirror-inverted with respect to the x axis in FIGS. 1, 3, 5, and 7. In FIGS. 1 to 8, the respective distance from the coordinate center is plotted in mm on the horizontal axis (x axis) and the vertical axis, respectively.

Figure 2:
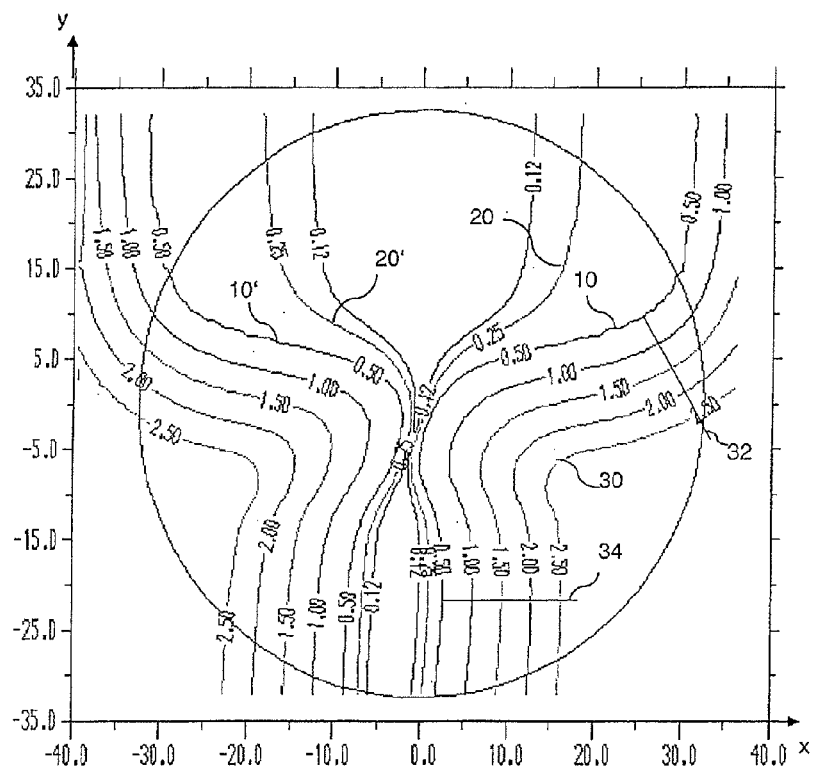
FIG. 2 illustrates a target astigmatism distribution of the first starting design.

FIG. 1 shows the construction lines—principal line, base target isoastigmatism line, and additional target astigmatism line—of a first, "soft" starting design. FIG. 2 shows the corresponding target astigmatism distribution of the first, "soft" starting design.

Figure 3:
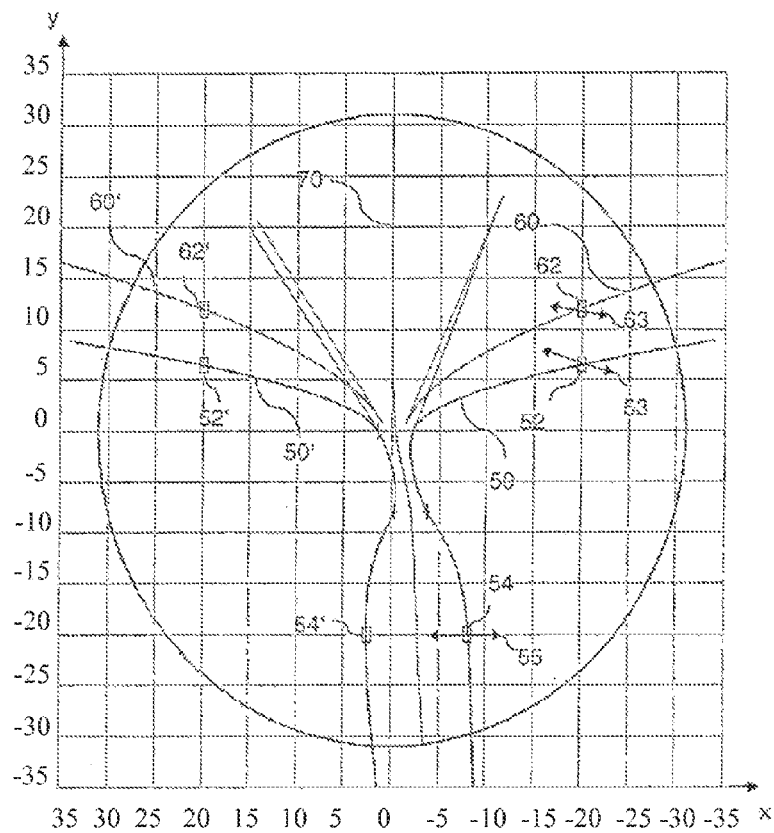
FIG. 3 illustrates construction lines and control points of a second starting design.
Figure 4:
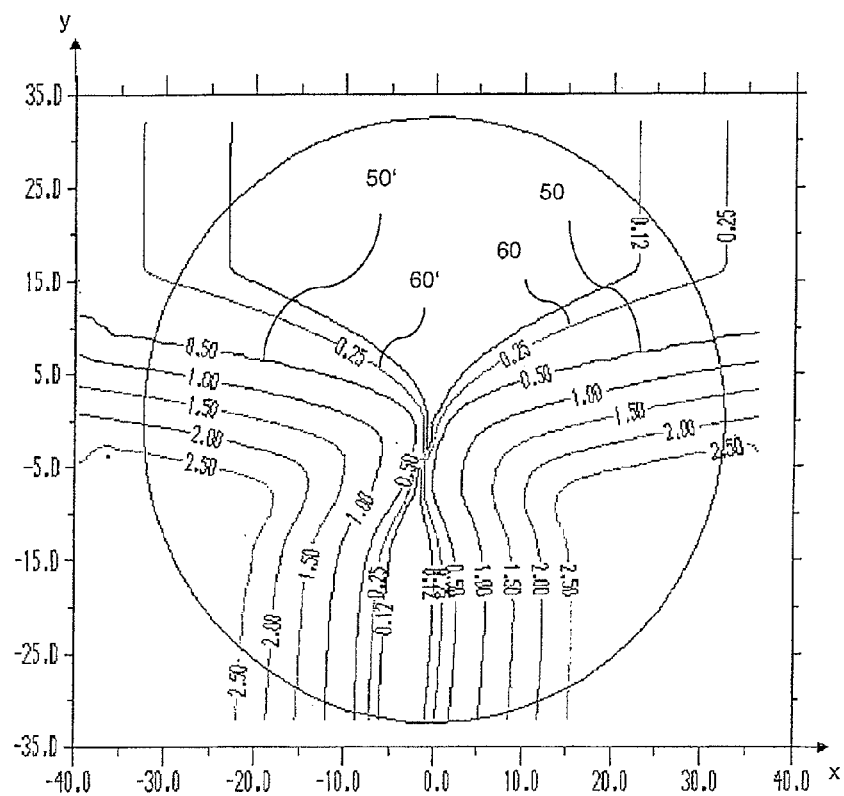
FIG. 4 illustrates a target astigmatism distribution of the second starting design.

FIG. 3 shows the construction lines—principal line, base target isoastigmatism line, and additional target astigmatism line—of a second, "hard" starting design. FIG. 4 shows the corresponding target astigmatism distribution of the second, "hard" starting design. Both in FIG. 2 and in FIG. 4, the astigmatism distribution of the corresponding design is illustrated by target isoastigmatism lines.

The starting designs shown in FIGS. 1 and 3 each have a principal line (reference numeral 40 in FIG. 1 and reference numeral 70 in FIG. 3), a nasal (reference numeral 10 in FIG. 1 and reference numeral 50 in FIG. 3) and a temporal (reference numeral 10' in FIG. 1 and reference numeral 50' in FIG. 3) 0.5 D base target isoastigmatism line. Moreover, in the distance portion or zone, the starting designs each have a nasal (reference numeral 20 in FIG. 1 and reference numeral 60 in FIG. 3) and a temporal (reference numeral 20' in FIG. 1 and reference numeral 60' in FIG. 3) additional 0.25 D target isoastigmatism line.

In the distance portion of the first, "soft" starting design shown in FIG. 1, the course of the base target isoastigmatism line (both temporal and nasal) is predetermined by the function $$u_G(y) = a + b\left(\operatorname{atan}\left(\frac{y-c}{d}\right) + \frac{\pi}{2}\right)$$

with the parameters a, b, c, d.

In the distance portion of the second, "hard" starting design shown in FIG. 3, the course of the base target isoastigmatism line (both temporal and nasal) is predetermined by the function $u_G(y) = a_f + b_f y + c_f y^n$ with the parameters $a_f$, $b_f$, $c_f$.

In the near portion of the starting design illustrated both in FIG. 1 and in FIG. 3, the course of the base target isoastigmatism line (both temporal and nasal) is predetermined by the function $$u_G(y) = a_n + \frac{b_n}{y} + \frac{c_n}{y^2} + \frac{d_n}{y^3}$$

with the parameters $a_n$, $b_n$, $c_n$, $d_n$.

In the distance portion of the first, "soft" starting design illustrated in FIG. 1, the nasal 0.5 D base target isoastigmatism line 10 passes through a first 12 and a second 14 control point. The first control point 12 can be moved along the straight line 13 illustrated as an arrow, and the second control point 14 can be moved along the straight line 15 illustrated as an arrow. Likewise, the nasal additional target isoastigmatism line in the distance portion passes through a first 22 and a second control point 24. The first control point can be moved along the straight line 23 illustrated as an arrow, and the second control point can be moved along the straight line 25 illustrated as an arrow. In the near portion, the nasal base target isoastigmatism line passes through a third control point 16, along which the straight line 17 illustrated as an arrow can be moved.

The construction of the temporal base target isoastigmatism line 10' is equal to the construction of the nasal base target isoastigmatism line. Accordingly, the temporal base target isoastigmatism line also passes through a first 12', a second 14', and a third 16' control point. Likewise, the construction of the additional temporal target isoastigmatism line 20' is equal to the construction of the nasal additional target isoastigmatism line 20. Accordingly, the temporal additional target isoastigmatism line passes through a first 22' and a second 24' control point.

In the distance portion, the nasal base target isoastigmatism line 50 of the starting design shown in FIG. 3 passes through a first control point 52, along which the straight line 53 illustrated as an arrow can be moved. In the near portion, the nasal base target isoastigmatism line 50 passes through a second control point 54, along which the straight line 55 illustrated as an arrow can be moved. The temporal base target isoastigmatism line 50' has the same configuration as the nasal base target isoastigmatism line 50. The reference numerals 52' and 54' designate the corresponding control points through which the temporal base target isoastigmatism line 50' passes. Likewise, the nasal additional target isoastigmatism line 60 in the distance portion has a first control point 62, which can be moved along the straight line 63 illustrated as an arrow. The temporal additional target isoastigmatism line 60' has a corresponding control point 62'.

The distribution of the target astigmatism is determined by additionally specifying the outer or maximum 2.5 D target isoastigmatism line 30 with the value of the target astigmatism value $A_{max}$ ($A_{max}$=2.5 D in the present case), the distance of the maximum 2.5 D target isoastigmatism line 30 from the base target isoastigmatism line along a first predetermined straight line 32 in the distance portion and the distance of the maximum 2.5 D target isoastigmatism line 30 from the base target isoastigmatism line along a second predetermined straight line 34 in the near portion.

Both the first, "soft" and the second, "hard" starting design are transformed, wherein between a vertical coordinate $y_F$ and a vertical coordinate $y_N$ (i.e. in the progression zone) there is no change of the base target isoastigmatism lines 10 and 10' of the first starting design or the base target isoastigmatism lines 50 and 50' of the second starting design.

Figure 5:
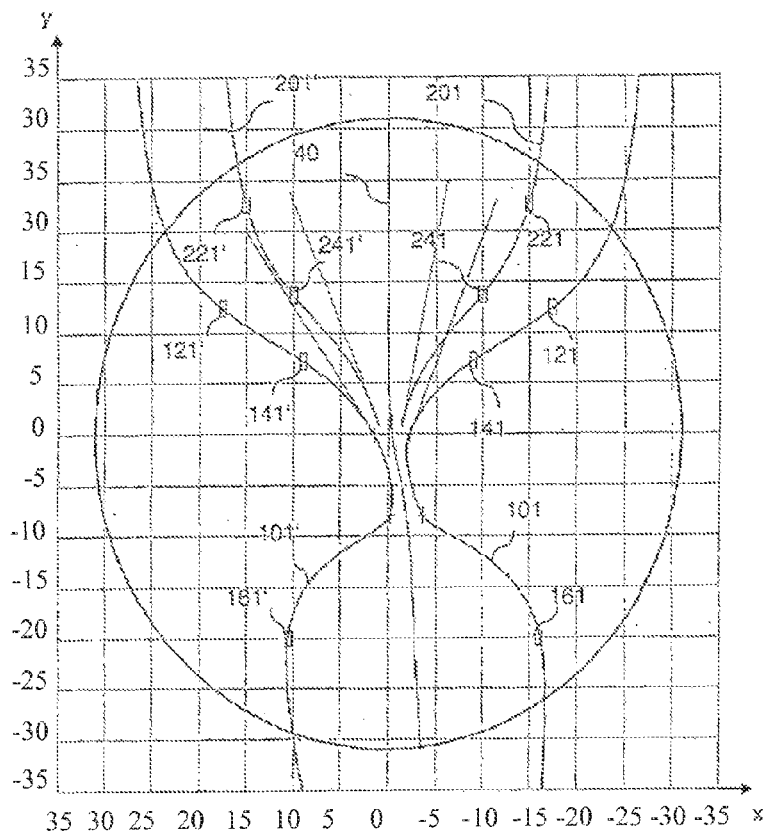
FIG. 5 illustrates construction lines and control points of a progressive lens design derived from the first starting design.
Figure 6:
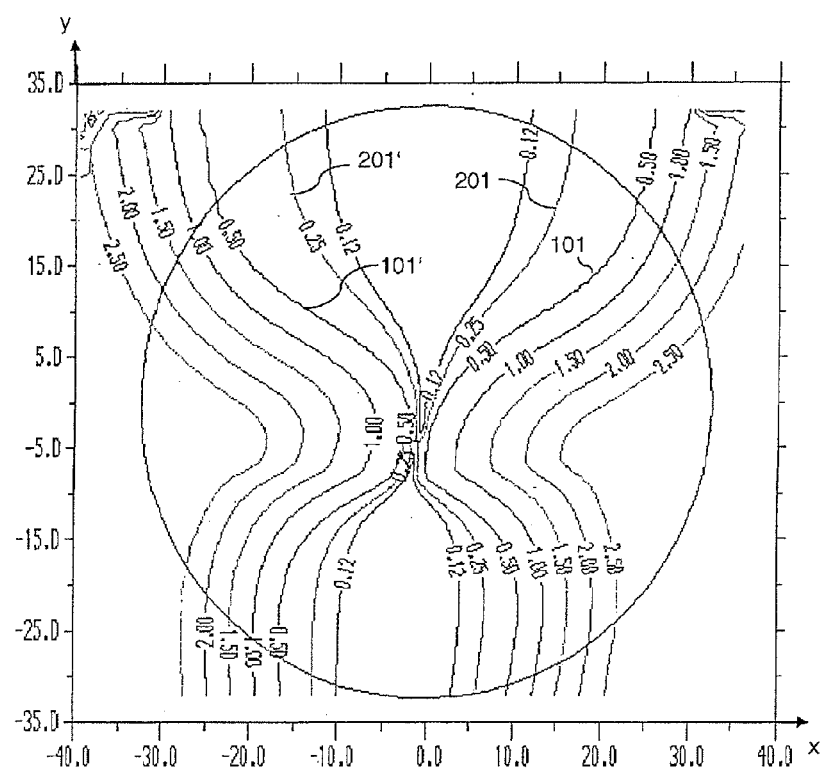
FIG. 6 illustrates a target astigmatism distribution of the progressive lens design illustrated in FIG. 5.

FIGS. 5 and 6 show an example of a progressive lens design derived or transformed from the starting design illustrated in FIG. 1. FIG. 5 shows the modified construction lines (the modified temporal and nasal base target isoastigmatism lines 101, 101' and the modified additional temporal and nasal target isoastigmatism lines 201, 201') as well as the positions of the correspondingly shifted control points of the base target isoastigmatism lines and the additional target isoastigmatism lines. In FIGS. 5 and 6, the reference numerals 121, 121' designate the shifted control points 12, 12';
the reference numerals 141, 141' designate the shifted control points 14, 14';
the reference numerals 161, 161' designate the shifted control points 16 and 16';
the reference numerals 221, 221' designate the shifted control points 22 and 22';
the reference numerals 241, 241' designate the shifted control point 24, 24'.

FIG. 6 shows the target astigmatism distribution of the design derived from the first design. The derived progressive lens design has a broad near portion, but reductions in the lateral distance portion.

Figure 7:
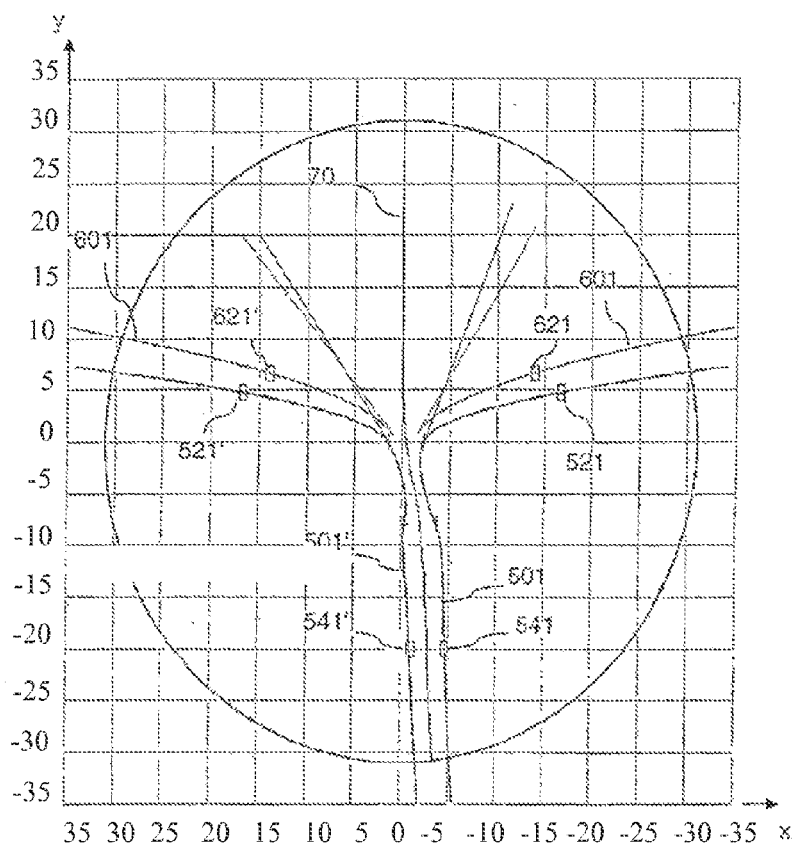
FIG. 7 illustrates construction lines and control points of a progressive lens design derived from the second starting design.
Figure 8:
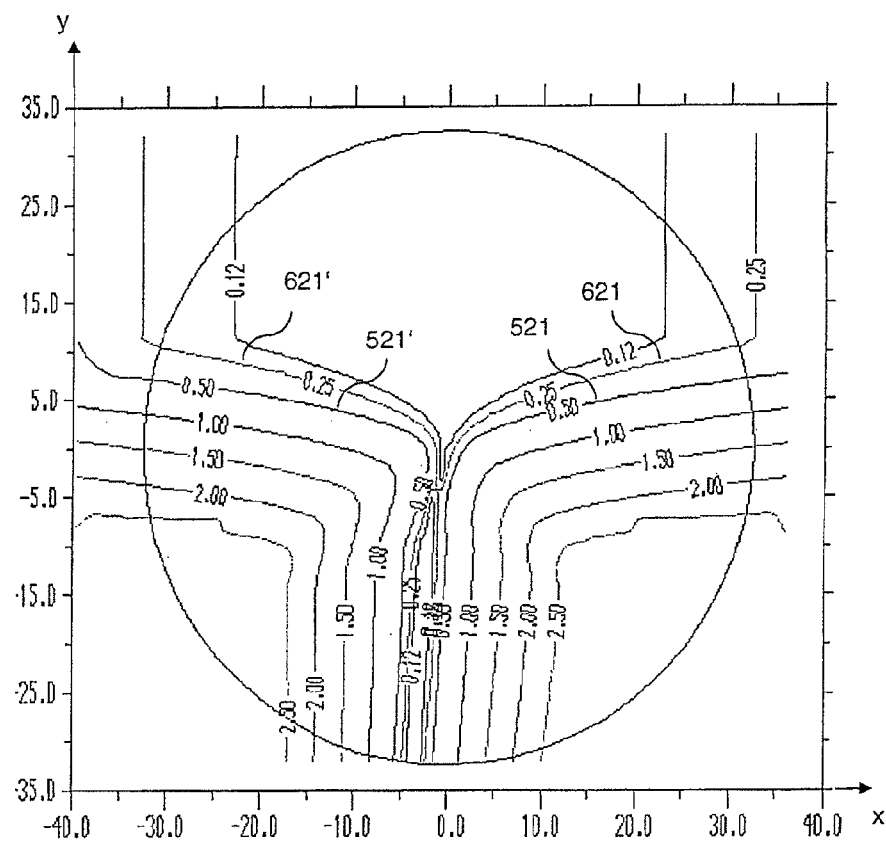
FIG. 8 illustrates a target astigmatism distribution of the progressive lens design illustrated in FIG. 7.

FIGS. 7 and 8 show an example of a progressive lens design derived or transformed from the starting design illustrated in FIG. 3. FIG. 7 shows the modified construction lines (modified temporal 501 and nasal 501' base target isoastigmatism line, modified temporal 601 and nasal 601' additional target isoastigmatism line) as well as the positions of the correspondingly shifted control points. In FIGS. 7 and 8, the reference numerals 521, 521' designate the shifted control points 52 and 52';

the reference numerals 541, 541' designate the shifted control points 54 and 54';

the reference numerals 621, 621' designate the shifted control point 62, 62'.

FIG. 8 shows the target astigmatism distribution of the progressive lens design derived from the second starting design. The derived progressive lens design has a minimum near portion width and a large deficit-free distance portion.

Figure 9:
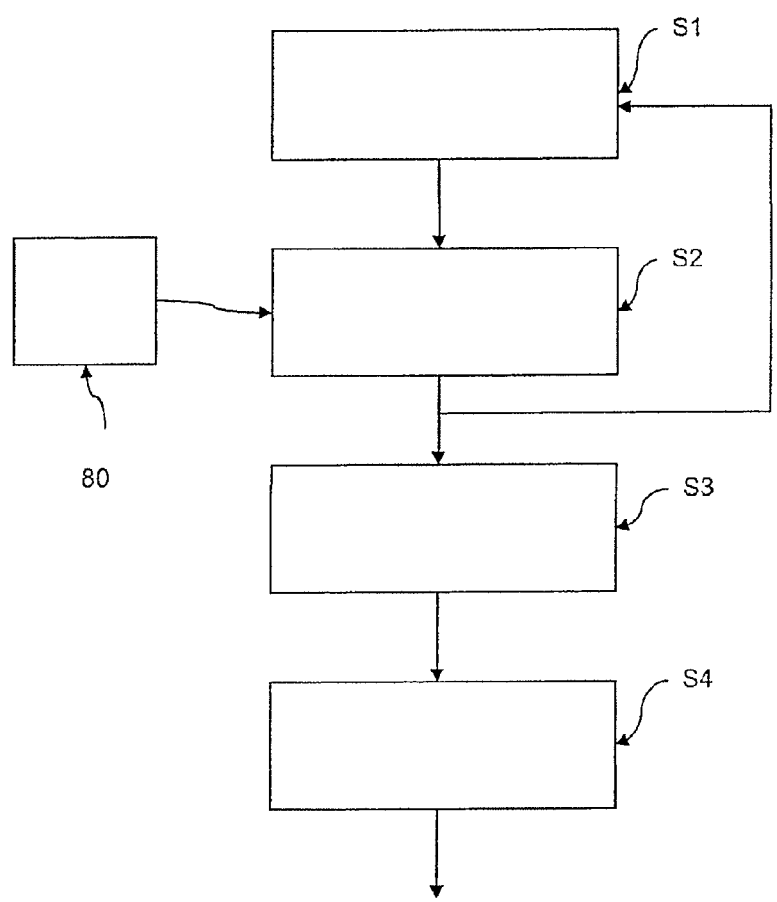
FIG. 9 illustrates a schematic representation of an exemplary process flow according to an exemplary embodiment.

FIG. 9 schematically shows an exemplary process flow for the production of (an individually optimized) progressive spectacle lens on the basis of a determined progressive lens design calculated according to a preferred method.

In a first step (S1), the individual data of the spectacle wearer is obtained. The individual data of the spectacle wearer is obtained by suitable graphical user interfaces (GUI), which allow the input and optionally the change of the input individual data of the spectacle wearer.

The individual data of the spectacle wearer in particular comprises individual refraction data (sphere, cylinder, cylinder axis, addition, prism, and base), individual frame and centration data (vertical lens size and centering height, frame shape), and individualizing parameters or individual parameters of the eyes of the spectacle wearer and/or the individual situation of wear or position of wear of the spectacles in front of the eyes of the spectacle wearer (in particular pupillary distance, corneal vertex distance, forward inclination, face form angle, etc.).

The frame and centration data can be specified by the user (e.g. an optician). Alternatively, the frame data can be retrieved from a database. The individual parameters (in particular pupillary distance, corneal vertex distance, forward inclination, face form angle) can be determined automatically by a suitable 3D measuring apparatus, such as ImpressionIST by the company Rodenstock GmbH. Alternatively, the individual parameters can be obtained by conventional measuring tools.

The individual data of the spectacle wearer further preferably comprises data relating to the previous spectacle lens, in particular data relating to the type of spectacle lens (single-vision, bifocal, progressive) and/or the progression length;

data relating to the dioptric power, in particular the additional of the previous spectacle lens.

The data relating to the type of spectacle lens (single-vision, bifocal, progressive) and the progression length of the previous lens can be taken into account in the optimization of the spatial position of the distance and near reference points, the optical power, the course of the base target isoastigmatism line (or position and location of the viewing zones), etc. Moreover, the data relating to the previous lens can comprise data relating to desired improvements with respect to the so-far worn spectacles, for example larger distance zone, larger intermediate zone, larger near zone, less infraduction when reading or reduced rocking motion.

Furthermore, the individual data of the spectacle wearer can comprise data relating to the main use or data relating to the main focuses of use (e.g. driving, computer workplace, reading, craftwork, etc.) of the progressive lens.

The individual data of the spectacle wearer can also comprise data relating to the preferences with respect to the viewing zones (distance, near, and intermediate or progression zones). This data can be obtained by suitable graphical user interfaces, for example. This data is preferably also taken into account in the calculation of the individual optimum size of the viewing zones or the individual optimum course of the base target isoastigmatism line, as well as optionally in the calculation of the optimum position or location of the distance and/or near reference point(s). The individual viewing zones can be assigned corresponding weightings (Preference-Distance, PreferenceNear, PreferenceIntermediateZone) on the basis of the obtained individual preferences. Likewise, from the data relating to the so-far-worn spectacle lens and data relating to the desired improvements, an ideal position of the reference points (distance and near reference point) can be determined with respect to the desired improvements by suitably assigning weightings.

Also, data relating to the material (plastics/silicate) and/or the refractive index of the previous lens can be obtained and evaluated. If a progressive lens has been worn already, the data relating to the previous lens can comprise data relating to the design of the spectacle lens (hard/soft) and/or the type of the progressive lens (individual, conventional).

Moreover, the individual data of the spectacle wearer can comprise data relating to environmental influences (brightness of the surrounding, etc.); and/or the main directions of sight distance and near, and/or potentially present, exceptional head and body postures; and/or physiological parameters of the eyes of the spectacle wearer, in particular visus with correction, threshold of stereopsis.

Accordingly, suitable graphical user interfaces for inputting and optionally correcting this data can be provided.

Furthermore, the individual data preferably comprises data relating to the individual object distances: working distance when reading (near work), working distance in the distance and/or data relating to the object distances in the refraction determination: distance and near. The specifications for the object distances distance and near are preferably taken into account in the calculation and optimization of the individual design for the progressive spectacle lens as well as in the optimization of the individual spectacle lens. Thus, the ray path, which corresponds to the actual situation of wear, can be simulated more precisely and consequently, the imaging quality can be improved.

The individual data of the spectacle wearer is obtained and evaluated and controls the determination of the optimum course of the base target isoastigmatism line or the optimum size of the viewing zones and preferably the optimum spatial position of the reference points distance and near.

In a second step (S2), a course of the base target isoastigmatism line, which is best for a specific spectacle wearer in a specific situation of wear, and thus the optimum size and/or position of the viewing zones (distance, near and progression zones) as well as optionally an optimum spatial position of the distance and/or near reference point(s) is/are calculated or defined on the basis of the obtained individual data. This can be done manually or preferably automatically on the basis of the obtained individual data.

In particular, an optician himself can define an "ideal" course of the base target isoastigmatism line (and thus of the position and size of the viewing zones) and an "ideal" individual position of the distance and/or near reference point(s) for the lens order on the basis of the obtained individual data. Preferably however, the ideal course of the base target isoastigmatism line and the ideal position are automatically calculated from the obtained preferences and optionally desired improvement with the help of a computer.

In a further step (S3), a progressive lens design or a proposal for a progressive lens design is calculated with the optimum course of the base target isoastigmatism line determined in step S2 and preferably with the determined optimum positions of the distance and near reference points according to a preferred method by a transformation of a specified starting design 80. This design proposal is visualized by suitable graphical user interfaces, wherein the user is given the chance to actively modify the design by changing the course of the base target isoastigmatism line (e.g. by shifting the control points) and optionally the individual position of the distance and/or near reference point(s) and/or by changing the individual customer data, in particular the preferences, the frame date, the weightings, etc.

The course of the base target isoastigmatism line and optionally the position of the distance and/or near reference point(s) and/or the preferences with respect to the viewing zones can be changed or adapted by a suitable graphical user interface, for example.

The new spectacle lens design is preferably calculated and visualized in real time. Preferably, the difference or the modification of the optical properties of the new spectacle lens design with respect to the old one is visualized.

In addition, the corresponding geometric data of a spectacle lens (center thickness, edge thickness, base curve, weight), calculated on the basis of the calculated (individual) design or design proposal, can be calculated and be visualized as well by a suitable graphical user interface (preferably in the form of a three-dimensional module). In particular, the cosmetic properties or data relating to the aesthetics of the spectacle lens (e.g. weight, geometric data, such as fabrication height, maximum edge thickness, center thickness, etc.) can be visualized. The visualization of the cosmetic properties of the spectacle lens can for example be achieved by a three-dimensional graphical representation of a model of the spectacle lens with the determined geometric data. The representation of the cosmetic properties of the spectacle lens can be influenced by a selection of the base curve and the refractive index, for example. The selection may depend on the power.

In addition to the visualization of the cosmetic properties of the spectacle lens, a visualization of the optical properties of the spectacle lens (viewing zones, in particular spatial position and size of the individual viewing zones, course of the base target isoastigmatism line, etc.) can be performed. The representation of the sizes of the viewing zones can merely take place relative to the prescription data without taking a possible material dependence into account. Of course, consideration of a material dependence can be provided for.

In addition, a visualization of the viewing comfort (e.g. infraduction, rocking, peripheral vision, distortions, etc.) can be provided for.

In addition, a suitable representation of performance values relating to the viewing zones, the viewing comfort and/or the cosmetic properties or the aesthetics of the calculated spectacle lens can be provided for. Moreover, alternative design proposals and/or performance values of alternative design proposals can be presented as well.

Subsequently (step S4), an individual progressive spectacle lens is calculated or optimized on the basis of a final individual design, wherein individual data relating to the spectacle wearer (such as individual situation of wear, frame data, data relating to the eyes of the spectacle wearer, etc.) can be taken into account as well in the calculation or optimization of the spectacle lens. The final calculated or optimized spectacle lens can be produced by direct machining with numerically controlled machines, by a casting method, or by other suitable methods e.g. from glass or plastics (step S5).

FIG. 10 illustrates the calculation of the target astigmatism values in the periphery of the spectacle lens according to the parallel curve model method (referred to as PC model in FIG. 10) and according to the truncated cone model method (referred to as TC model in FIG. 10).

It should be understood that while the foregoing has been described in conjunction with exemplary embodiments, it is understood that the term "exemplary" is merely meant as an example, rather than the best or optimal. Accordingly, the disclosure herein is intended to cover alternatives, modifications and equivalents, which may be included within the spirit and scope of the disclosed apparatus and method.

Additionally, in the preceding detailed description, numerous specific details have been set forth in order to provide a thorough understanding of the present disclosure. However, it should be apparent to one of ordinary skill in the art that the embodiments described herein may be practiced without these specific details. In other instances, well-known methods, procedures, components, and circuits have not been described in detail so as not to unnecessarily obscure aspects of the disclosure herein.

LIST OF REFERENCE NUMERALS 10, 10' base target isoastigmatism line
12, 12' first control point of the base target isoastigmatism line 10, 10'
13 straight line along which the control point 12 can move
14, 14' second control point of the base target isoastigmatism line 10, 10'
15 straight line along which the control point 14 can move
16, 16' third control point of the base target isoastigmatism line 10, 10'
17 straight line along which the control point 16 can move
20, 20' additional target isoastigmatism line
22, 22' first control point of the additional target isoastigmatism line 20, 20'
23 straight line along which the control point 22 can move
24, 24' second control point of the additional target isoastigmatism line 20, 20'
25 straight line along which the control point 24 can move
30 outer, maximum target isoastigmatism line
32, 34 straight lines
40 principal line
50, 50' base target isoastigmatism line
52, 52' first control point of the base target isoastigmatism line 50, 50'
53 straight line along which the control point 52 can move
54, 54' second control point of the base target isoastigmatism line 50, 50'
55 straight line along which the control point 54 can move
60 additional target isoastigmatism line
62, 62' first control point of the additional target isoastigmatism line 60, 60'
63 straight line along which the control point 62 can move
73 principal line
101', 101' modified base target isoastigmatism line
121, 121' first control point of the modified base target isoastigmatism line 101, 101
131 straight line along which the control point 121 can move
141, 141' second control point of the modified base target isoastigmatism line 101, 101'
151 straight line along which the control point 141 can move
161, 161' third control point of the modified base target isoastigmatism line 10, 10'
171 straight line along which the control point 16 can move
201, 201' modified additional target isoastigmatism line
221, 221' first control point of the modified additional target isoastigmatism line 201, 201'

231 straight line along which the control point 221 can move
241, 241' second control point of the modified additional target isoastigmatism line 201, 201'
251 straight line along which the control point 24 can move
501, 501' modified base target isoastigmatism line
521, 521' first control point of the modified base target isoastigmatism line 501, 501
541, 541' second control point of the modified base target isoastigmatism line 501, 501'
601, 601' additional target isoastigmatism line
621, 621' first control point of the modified additional target isoastigmatism line 601, 601'
80 data relating to the basic design
S1 obtaining individual data
S2 calculating an individual design
S3 optimizing or calculating an individual spectacle lens
S4 machining of the spectacle lens
$Y_F$ vertical coordinate on the border distance portion-progression zone
$Y_N$ vertical coordinate on the border near portion-progression zone

The invention claimed is:

1. A method for creating a progressive spectacle lens design and manufacturing a progressive spectacle lens, comprising:
defining a starting design that comprises specification of a principal line, specifications for target astigmatism values $A(u=0,y)$ along the principal line, and specifications for the course of at least one base target isoastigmatism line, which is described by a one-dimensional function of the form $u_G(y)=f(y)$;
modifying the course of the base target isoastigmatism line $u_G(y) \to u'_G(y)$;
calculating the target astigmatism values $A(u,y)$ of the spectacle lens design by an interpolation between the target astigmatism values $A(u=0,y)$ on the principal line and the target astigmatism values $A(u'_G(y),y)$ on the modified base target isoastigmatism line,
wherein
U designates the horizontal distance from the principal line of a point $(u,y)$ of the spectacle lens design,
y designates the vertical coordinate of the point $(u,y)$ of the spectacle lens design,
$u_G(y)$ designates the horizontal distance from the principal line of a point $(u_G(y),y)$ on the base target isoastigmatism line, and
$u'_G(y)$ designates the horizontal distance from the principal line of a point $(u'_G(y),y)$ on the modified base target isoastigmatism line; and
manufacturing, based on the target astigmatism values, the progressive spectacle lens.

2. The method according to claim 1, wherein the interpolation is a linear, quadrangular, or cubic interpolation.

3. The method according to claim 1,
wherein the defining step further comprises designing the starting design to further comprise a specification for the course of an additional target isoastigmatism line in the distance and/or one or more near portions, wherein the course of the additional target isoastigmatism line is described by a one-dimensional function of the form $u_z(y)=f_z(y)$
wherein the modifying step further comprises modifying the course of the additional target isoastigmatism line $u_z(y) \to u'_z(y)$, and wherein the interpolation between the target astigmatism values on the principal line and the target astigmatism values on the modified base target isoastigmatism line comprises an interpolation between the target astigmatism values $A(u=0,y)$ on the principal line and the target astigmatism values $A(u'_z(y),y)$ on the modified additional target isoastigmatism line, and an interpolation between the target astigmatism values $A(u'_z(y),y)$ on the modified additional target isoastigmatism line and the target astigmatism values $A(u'_G(y),y)$ on the modified base target isoastigmatism line,
wherein:
$u_z(y)$ designates the horizontal distance from the principal line of a point $(u_z(y),y)$ on the additional target isoastigmatism line, and
$u'_z(y)$ designates the horizontal distance from the principal line of a point $(u'_z(y),y)$ on the modified additional target isoastigmatism line.

4. The method according to claim 1, wherein in the progression zone, the course of the base target isoastigmatism line is not modified.

5. The method according to claim 1, wherein the base target isoastigmatism line passes through a first predetermined or predeterminable control point $\vec{r}_1=(u_1,Y_1)$, and wherein modifying the course of the base target isoastigmatism line comprises:
shifting the first control point $\vec{r}_1 \to \vec{r}'_1(u'_1, y'_1)$ along a predetermined or predeterminable curve; and
calculating the modified base target isoastigmatism line such that it passes through the shifted first control point $\vec{r}'_1(u'_1, y'_1)$.

6. The method according to claim 5, wherein the base target isoastigmatism line further passes through a second predetermined or predeterminable control point $\vec{r}_2=(u_2, y_2)$, and wherein modifying the course of the base target isoastigmatism line further comprises:
shifting the second control point $\vec{r}_2 \to \vec{r}'_2(u'_2, y'_2)$ along a predetermined or predeterminable curve; and
calculating the modified base target isoastigmatism line such that is passes through the shifted second control point $\vec{r}'_2(u'_2, y'_2)$.

7. The method according to claim 1, wherein the base target isoastigmatism line and the modified base target isoastigmatism line pass through at least one of a predetermined or predeterminable pivotal or fixed point $\vec{r}_0=(u_0, y_0)$, wherein $$u_G(y_0) = u'_G(y_0)$$
$$\frac{du_G(y_0)}{dy} = \frac{du'_G(y_0)}{dy}$$

for the pivotal or fixed point.

8. The method according to claim 1, wherein in the near portion, the course of the base target isoastigmatism line is described by the function:

$$u_G(y) = a_n + \frac{b_n}{y} + \frac{c_n}{y^2} + \frac{d_n}{y^3}$$

with the parameters or coefficients $a_n, b_n, c_n, d_n$.

9. The method according to claim 1, wherein in the distance portion, the course of the base target isoastigmatism line is described by an $n^{th}$-order polynomial:

$$u_G(y)=a_f+b_f y+c_f y^n$$

with the parameters $a_f, b_f, c_f$.

10. The method according to claim 1, wherein in the distance portion, the course of the base target isoastigmatism line is described by the function:

$$u_G(y) = a + b\left(\mathrm{atan}\left(\frac{y-c}{d}\right) + \frac{\pi}{2}\right)$$

with the parameters a, b, c, d.

11. The method according to claim 1, wherein the course of the base target isoastigmatism line is modified taking into account individual data of a wearer of the progressive spectacle lens.

12. The method according to claim 11, wherein the individual data of the wearer is data relating to at least one of the weighting of the distance and the one or more near zones, the focuses of use of the spectacles, and frame and centration data.

13. The method according to claim 11, further comprising obtaining individual parameters of the wearer.

14. The method according to claim 1, further comprising transforming the target astigmatism values depending on at least one of a variably adjustable, individual, vertical position of the distance and one or more near reference points, which is performed such that the individual spectacle lens design exhibits the required, individual, vertical position of the distance and one or more near reference points, respectively.

15. The method according to claim 1, wherein the starting design further comprises a specification for an object distance function along the principal line of the spectacle lens, which is transformed during at least one of the modifying and calculating steps.

16. An apparatus for creating a progressive spectacle lens design by transforming a predetermined starting design that includes specification of a principal line, specifications for target astigmatism values A(u=0,y) along the principal line, and specifications for the course of at least one base target isoastigmatism line, which is described by a one-dimensional function of the form $u_G(y)=f(y)$, and manufacturing a progressive spectacle lens, the apparatus comprising:

a modification unit configured to modify the course of the base target isoastigmatism line; and a calculation unit configured to calculate the target astigmatism values A(u,y) of the spectacle lens design by an interpolation between the target astigmatism values A(u=0,y) on the principal line and the target astigmatism values A(u'$_G$(y),y) on the modified base target isoastigmatism line, wherein u designates the horizontal distance from the principal line of a point (u,y) of the spectacle lens design, y designates the vertical coordinate of the point (u,y) of the spectacle lens design, $u_G(y)$ designates the horizontal distance from the principal line of a point ($u_G(y)$,y) on the base target isoastigmatism line, and $u'_G(y)$ designates the horizontal distance from the principal line of a point ($u'_G(y)$,y) on the modified base target isoastigmatism line; and manufacturing, based on the target astigmatism values, the progressive spectacle lens.

17. A non-transitory computer program product for calculating a progressive spectacle lens design, which when loaded on a computer and executed by a processor of the computer, causes the processor to:

define a starting design that comprises specification of a principal line, specifications for target astigmatism values A(u=0,y) along the principal line, and specifications for the course of at least one base target isoastigmatism line, which is described by a one-dimensional function of the form $U_G(y)=f(y)$;

modify the course of the base target isoastigmatism line $u_G(y) \to u'_G(y)$; and calculate the target astigmatism values A(u,y) of the spectacle lens design by an interpolation between the target astigmatism values A(u=0,y) on the principal line and the target astigmatism values A(u'$_G$(y),y) on the modified base target isoastigmatism line, wherein u designates the horizontal distance from the principal line of a point (u,y) of the spectacle lens design, y designates the vertical coordinate of the point (u,y) of the spectacle lens design, $u_G(y)$ designates the horizontal distance from the principal line of a point ($u_G(y)$,y) on the base target isoastigmatism line, and $u'_G(y)$ designates the horizontal distance from the principal line of a point ($u'_G(y)$,y) on the modified base target isoastigmatism line.

18. A non-transitory storage medium with a computer program stored thereon for calculating a progressive spectacle lens design, which when loaded on a computer and executed by a processor of the computer, causes the processor to:

define a starting design that comprises specification of a principal line, specifications for target astigmatism values A(u=0,y) along the principal line, and specifications for the course of at least one base target isoastigmatism line, which is described by a one-dimensional function of the form $u_G(y)=f(y)$;

modify the course of the base target isoastigmatism line $u_G(y) \to u'_G(y)$; and calculate the target astigmatism values A(u,y) of the spectacle lens design by an interpolation between the target astigmatism values A(u=0,y) on the principal line and the target astigmatism values A(u'$_G$(y),y) on the modified base target isoastigmatism line, wherein u designates the horizontal distance from the principal line of a point (u,y) of the spectacle lens design, Y designates the vertical coordinate of the point (u,y) of the spectacle lens design, $u_G(y)$ designates the horizontal distance from the principal line of a point ($u_G(y)$,y) on the base target isoastigmatism line, and $u'_G(y)$ designates the horizontal distance from the principal line of a point ($u'_G(y)$,y) on the modified base target isoastigmatism line.

19. The method according to claim 1, further comprising:
calculating a spectacle lens on the basis of the calculated spectacle lens design.

20. The method according to claim 19, wherein the step of calculating the spectacle lens takes into account individual data of the spectacle wearer.

21. The apparatus according to claim 16, further comprising:
a second calculating unit configured to calculate a spectacle lens on the basis of the calculated design.

22. The non-transitory computer program product according to claim 17, which when executed by the processor, further causes the processor to:
   calculate a spectacle lens on the basis of the calculated design.

23. The non-transitory storage medium with a computer program stored thereon according to claim 18, which when executed by the processor, further causes the processor to:
   calculate a spectacle lens on the basis of the calculated design.

* * * * *